Figure 1:
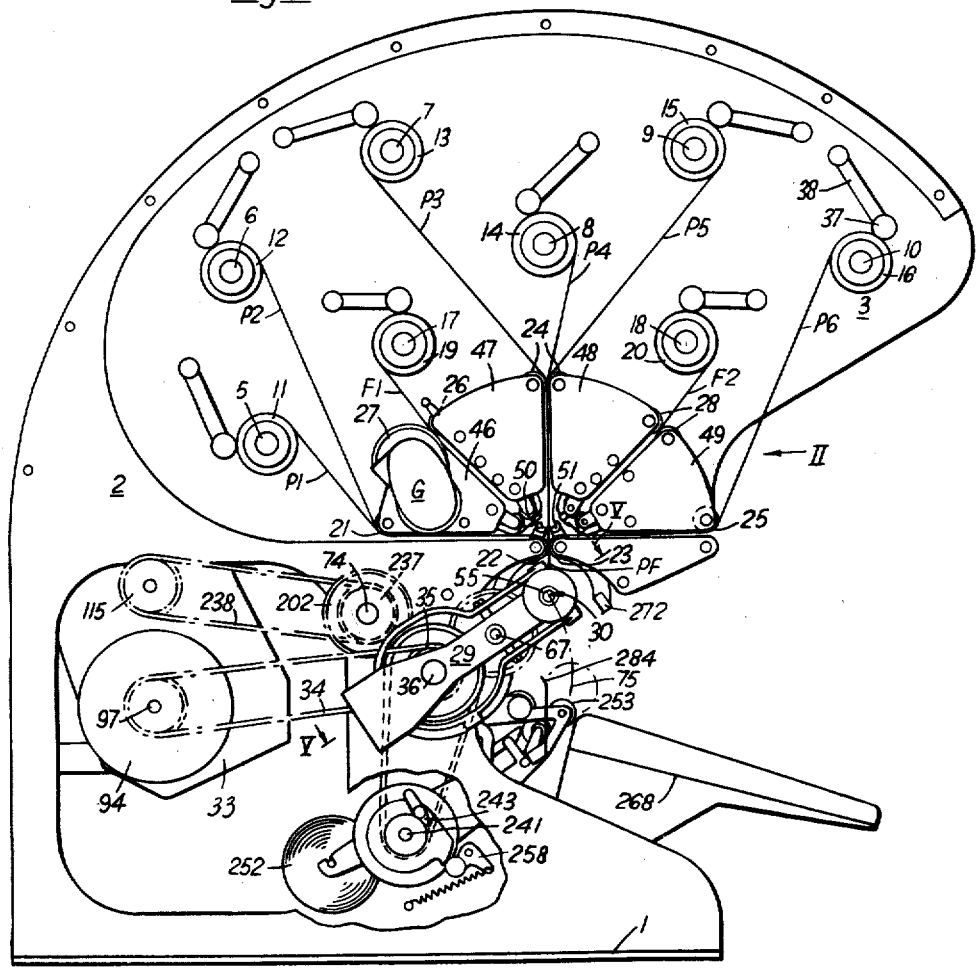

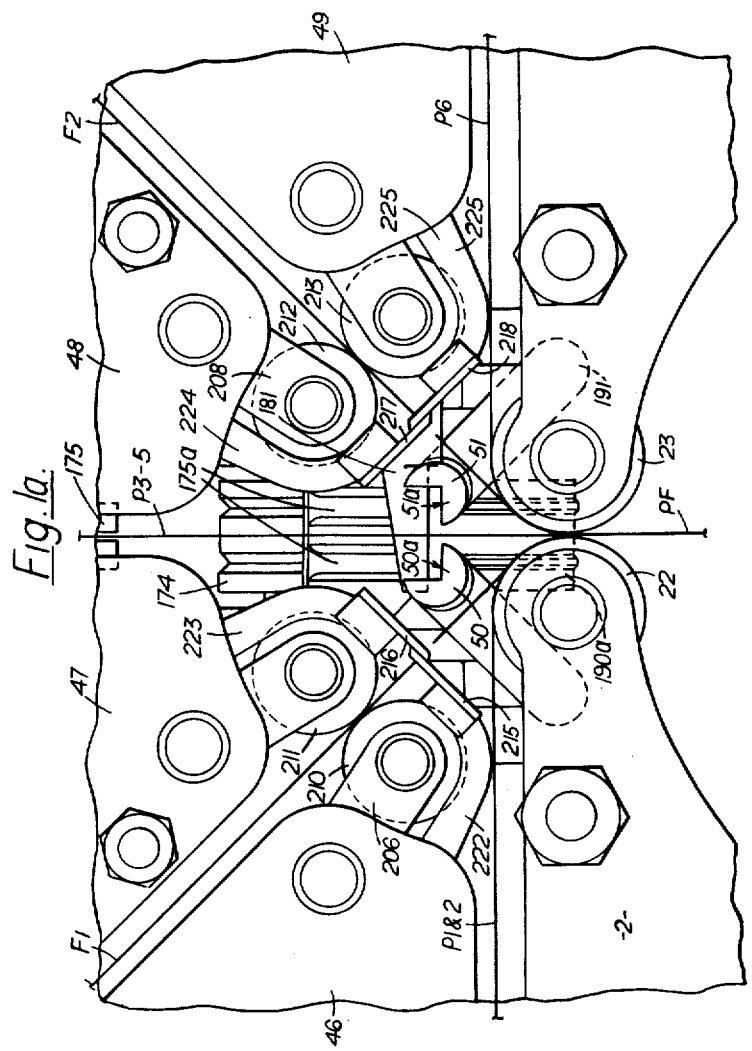

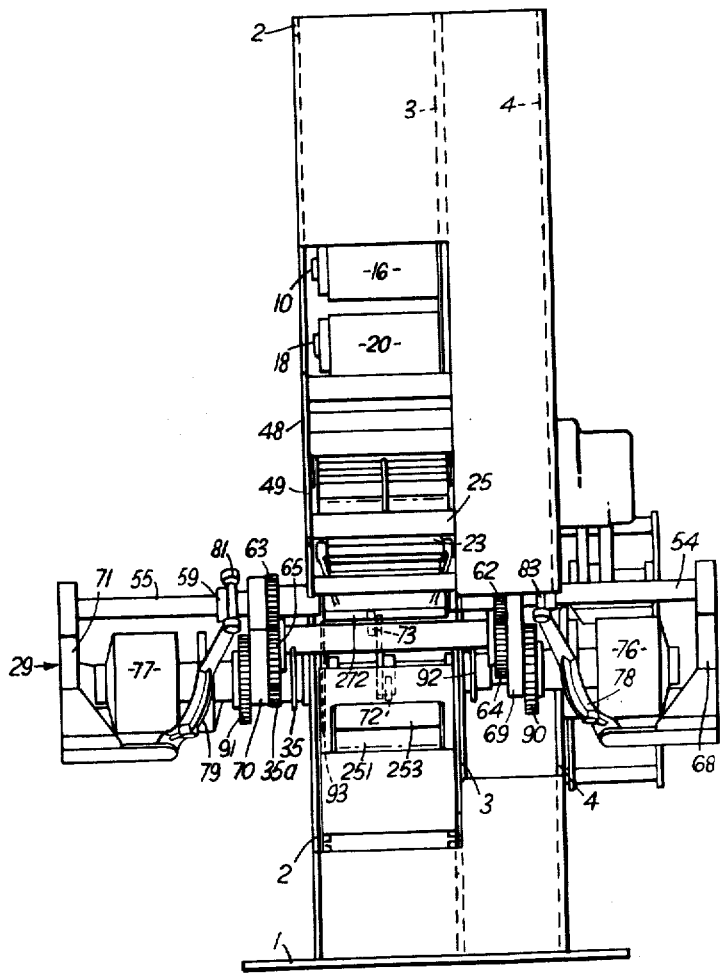

Dec. 10, 1963  R. HINDS  3,113,740
CAPACITOR WINDING MACHINES
Filed Oct. 20, 1961  19 Sheets-Sheet 5

Inventor
Ronald Hinds
By
Attorney

Dec. 10, 1963        R. HINDS              3,113,740
              CAPACITOR WINDING MACHINES
Filed Oct. 20, 1961                    19 Sheets-Sheet 6
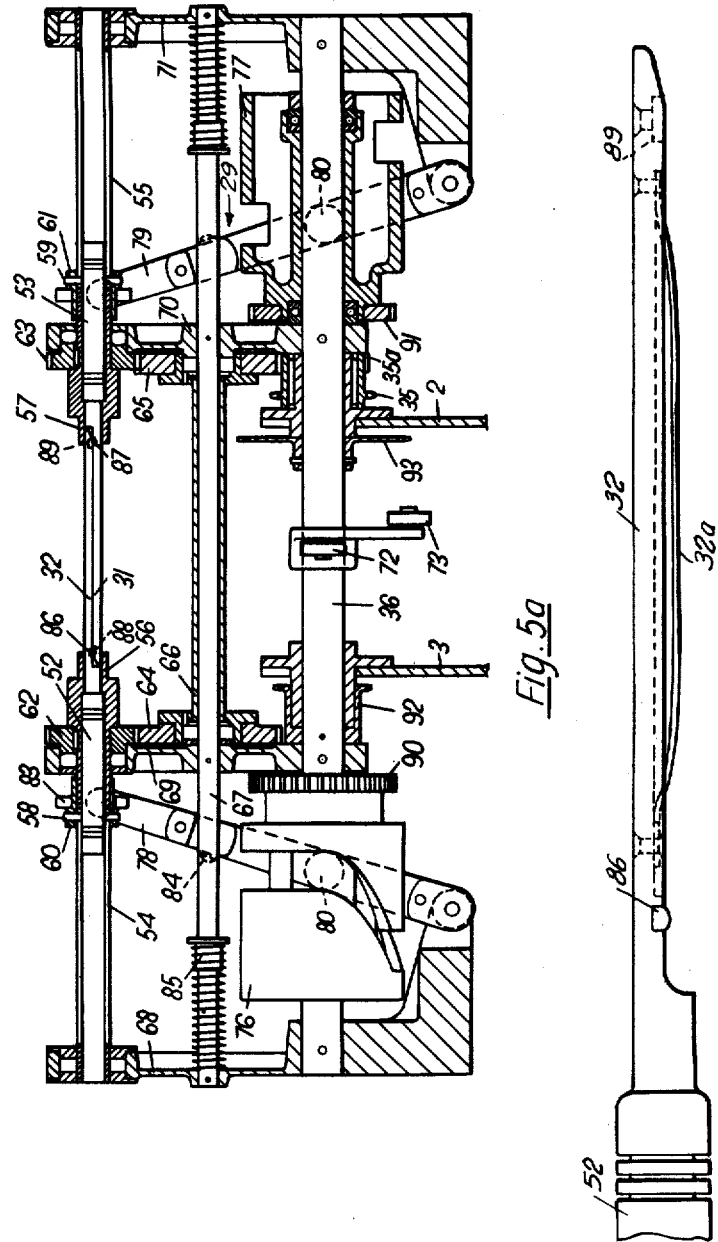

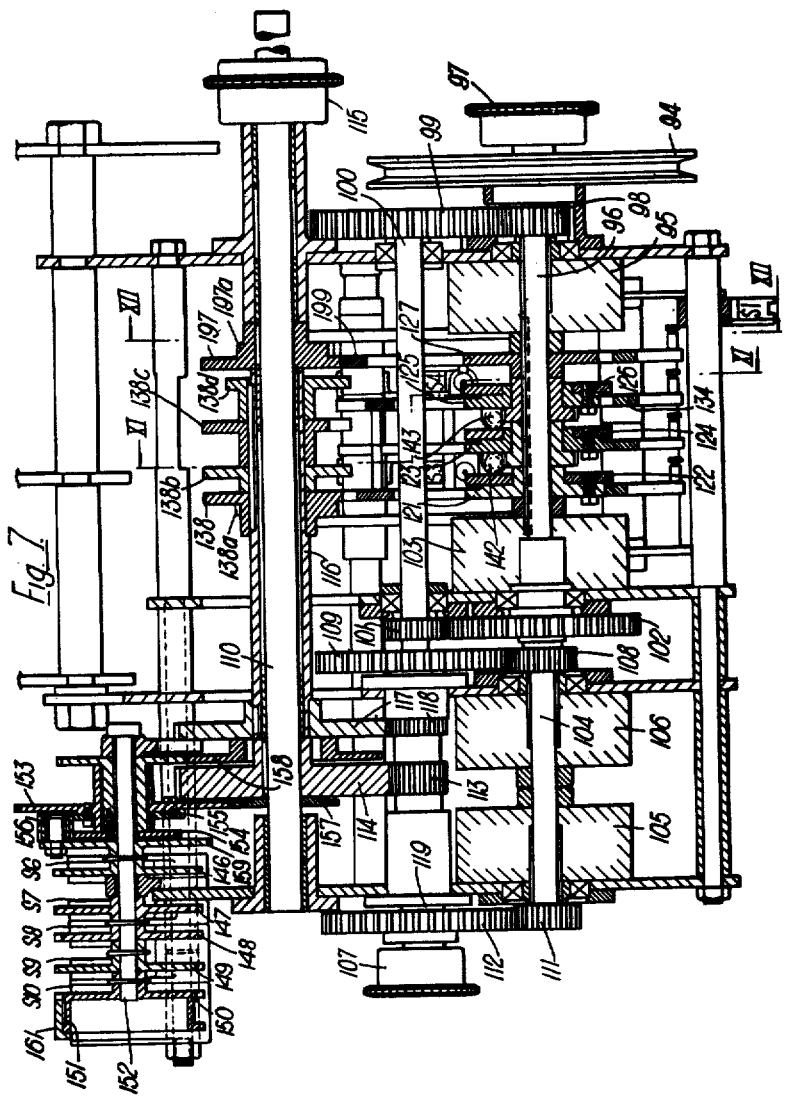

Dec. 10, 1963 R. HINDS 3,113,740
CAPACITOR WINDING MACHINES
Filed Oct. 20, 1961 19 Sheets-Sheet 8

Inventor
Ronald Hinds
By
Watt Mackey & Burden
Attorney

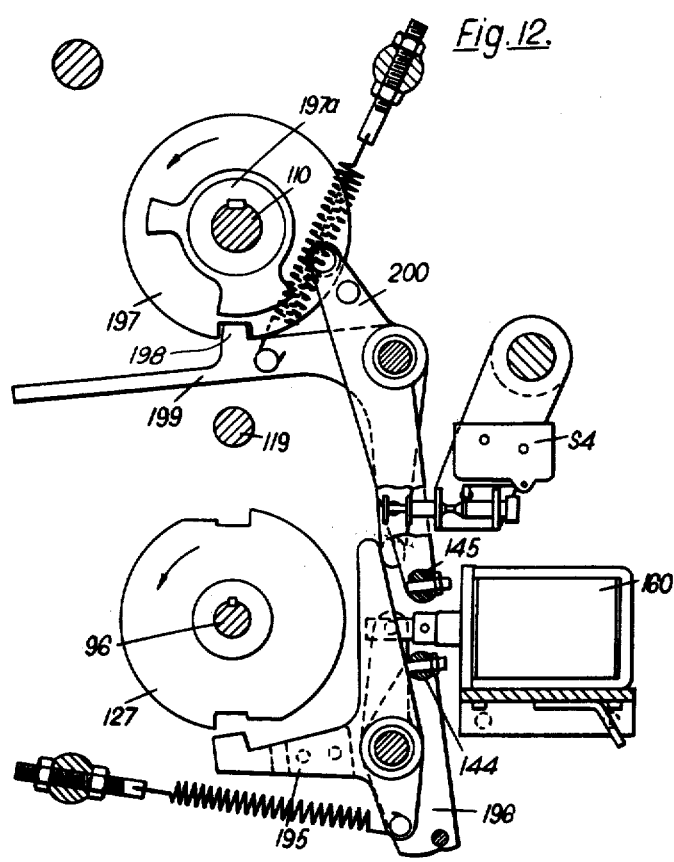

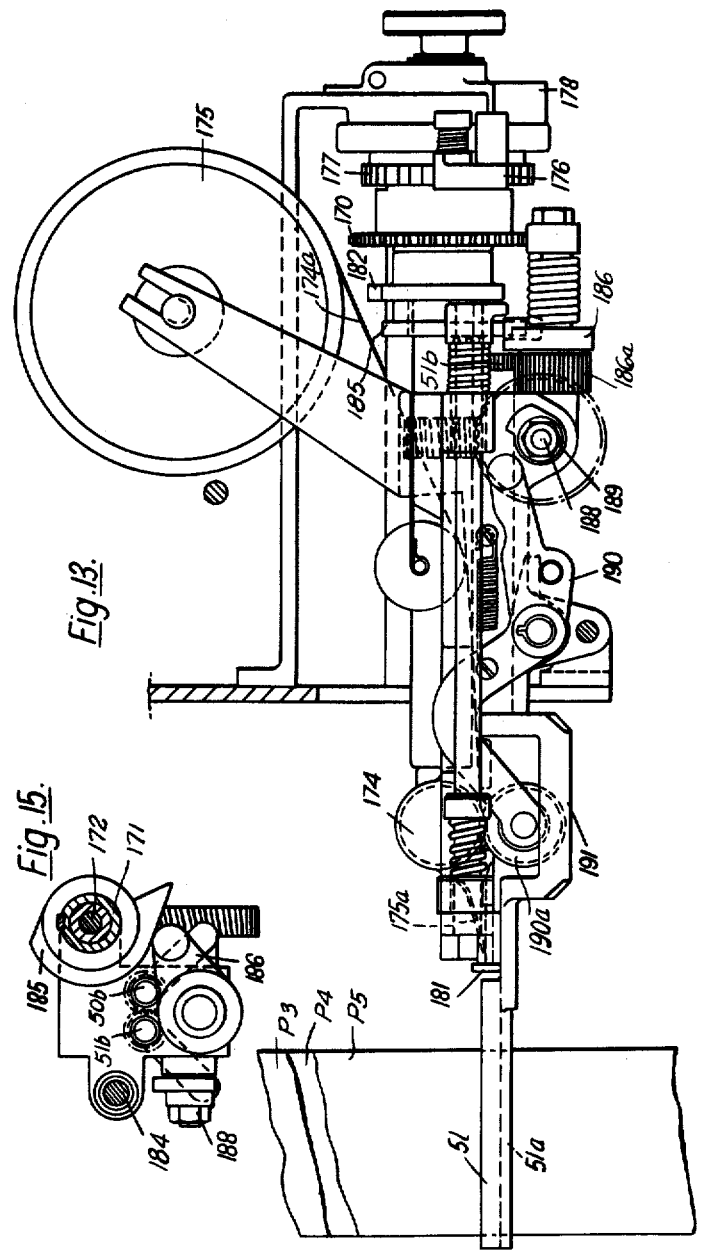

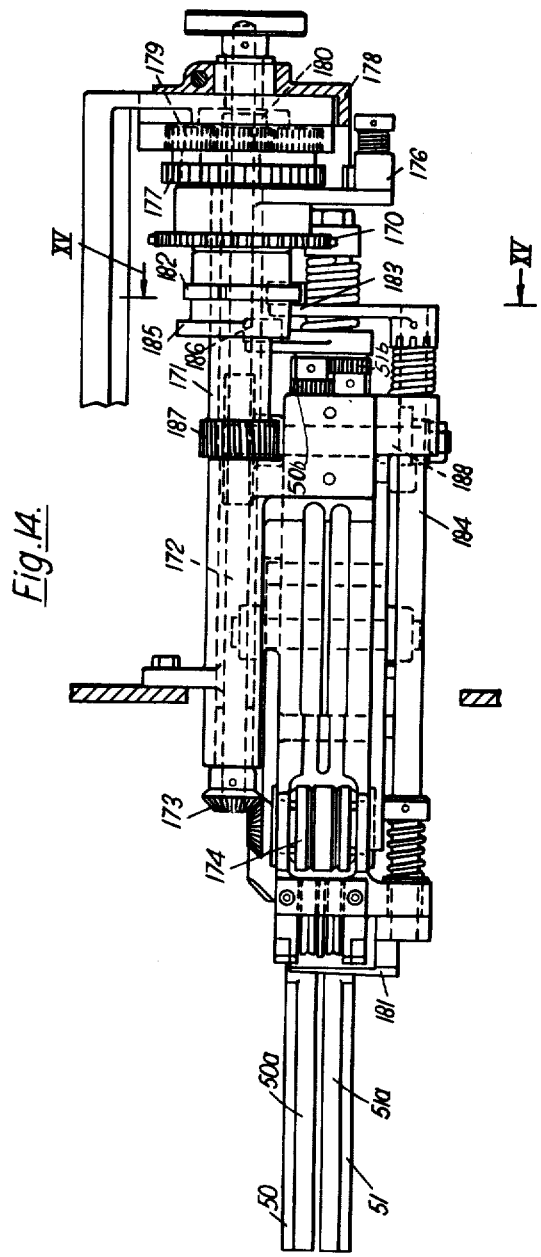

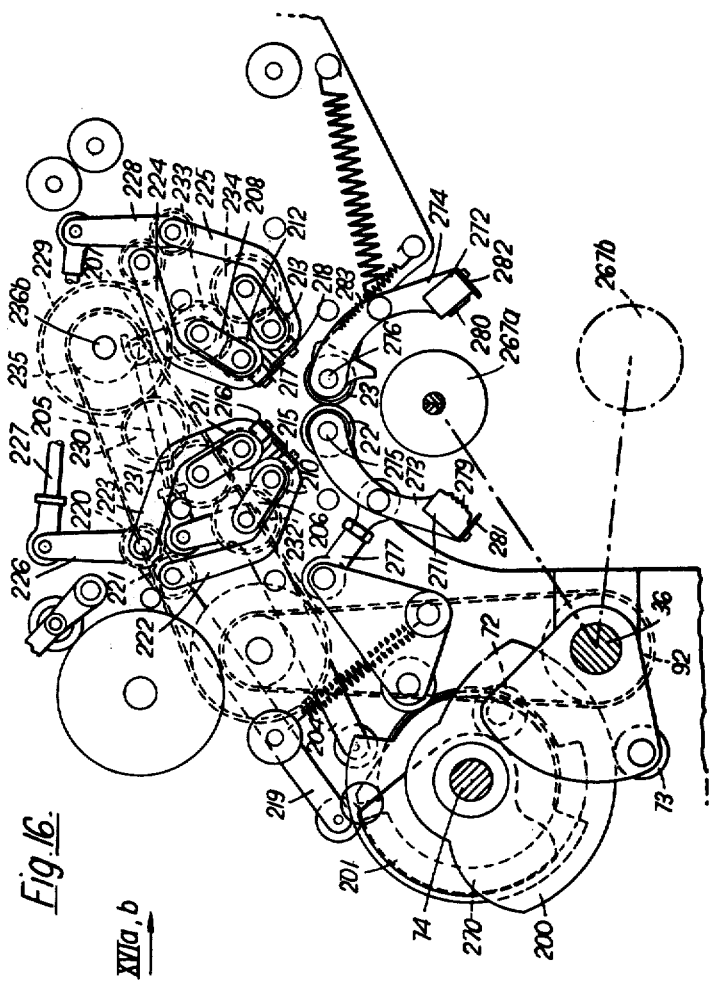

Dec. 10, 1963       R. HINDS       3,113,740
CAPACITOR WINDING MACHINES
Filed Oct. 20, 1961       19 Sheets-Sheet 16

Inventor
Ronald Hinds
By
Webb Racky & Burden
Attorney

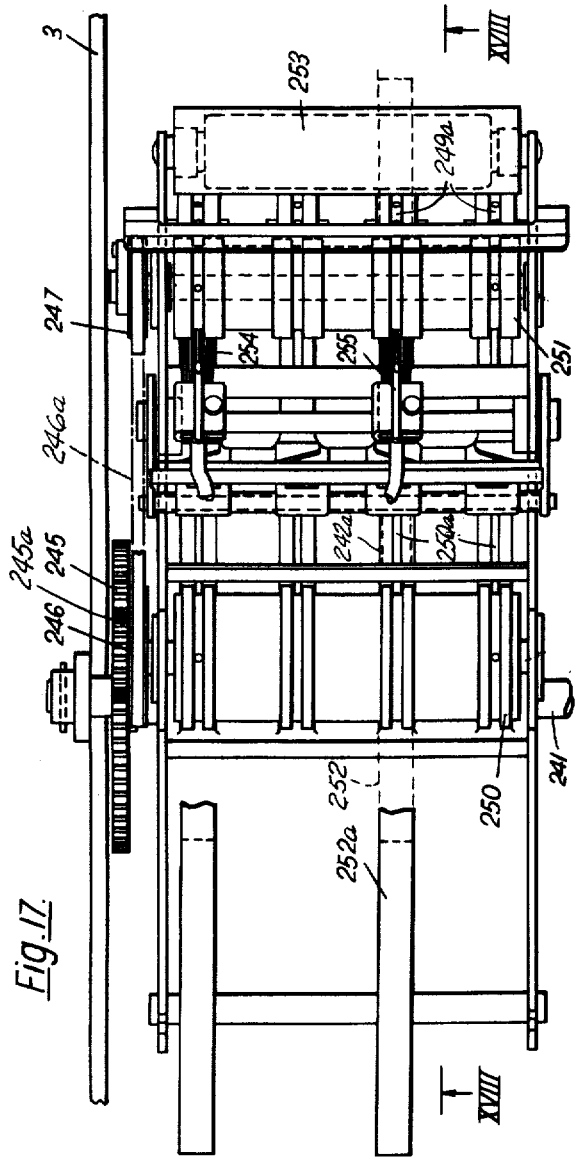

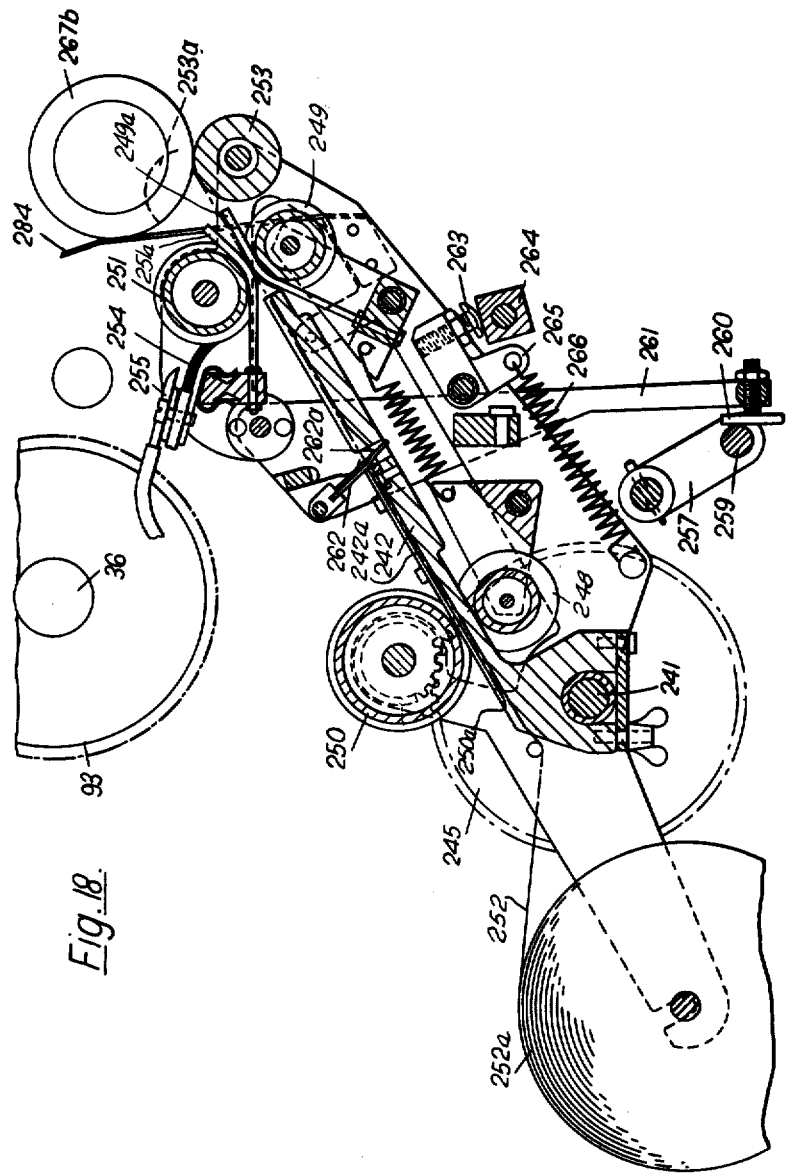

Dec. 10, 1963 R. HINDS 3,113,740
CAPACITOR WINDING MACHINES
Filed Oct. 20, 1961 19 Sheets-Sheet 19

Inventor
Ronald Hinds
By
Webb Mackey & Burden
Attorney 3,113,740
CAPACITOR WINDING MACHINES
Ronald Hinds, 12 Whitefield Road,
Stockton Heath, England
Filed Oct. 20, 1961, Ser. No. 149,804
28 Claims. (Cl. 242—56.1)

This invention relates to apparatus for manufacturing wound capacitors of the kind comprising two or more flexible strips wound together in the form of a roll; the strips may be composite strips, consisting of a strip of dielectric material having a conducting coating on one or both sides, or strips of dielectric material (e.g. paper) or strips of conducting material (e.g. metal foil), appropriately selected and arranged to provide two or more electrodes each separated by dielectric material. Two or more terminals may be inserted between turns of the roll in such a way as to make contact with the capacitor electrodes and to project from one or both ends of the roll. The terminals will usually (although not essentially) be strips of metal foil and for convenience they will hereinafter be referred to as "terminal tabs" or "tabs."

An object of the invention is to provide apparatus which winds capacitor elements automatically to the extent that, after completing the winding of one element it discharges that element and automatically commences to wind another element.

Another object of the invention is to provide a machine which inserts terminal tabs into the roll, as it is being wound, at predetermined radial distances from the axis of the roll and at predetermined angular relationship with each other, with respect to the roll axis.

A further object of the invention is to provide a two-part mandrel for use in the automatic capacitor winding machine in which, on completion of the winding of a capacitor element (in the form of a roll), the two parts are readily separated from each other to release the roll and can then be brought together again, one on each side of the composite strip of material severed from the roll, to enable the winding of another element to commence.

In accordance with the invention a capacitor winding machine comprises means for automatically carrying out the following steps in the following sequence: rotating a two-part mandrel when in a first position, to draw strips of flexible material through a guide which brings them into the form of a composite strip and to wind them in that form on to the mandrel to build up a capacitor element: moving the mandrel away from the guide into a second position after a predetermined length of the composite strip has been wound on the mandrel: stopping the rotation of the mandrel when it is in a predetermined angular position with respect to its axis of rotation: applying a clamp to the composite strip, between the first and second position of the mandrel: severing the composite strip between the clamp and the mandrel: separating the parts of the mandrel to release the capacitor element: and bringing the parts of the mandrel together again about the composite strip between the guide and the clamp, whereby on release of the clamp further rotation of the mandrel initiates the winding of another capacitor element.

In accordance with a further feature of the invention the capacitor winding machine comprises means for automatically carrying out the following steps in the following sequence: stopping the mandrel when it is in a predetermined angular position and a predetermined length of flexible material has been wound thereon: inserting a first terminal tab between a pair of strips being wound on the mandrel in contact with one electrode of the capacitor: rotating the mandrel through a predetermined angle (which may be less than or greater than 360°): inserting a second terminal tab between a pair of strips being wound on the mandrel in contact with another electrode of the capacitor and again rotating the mandrel to continue the winding operation.

In accordance with another feature of the invention the mandrel comprises two fingers which fit together side by side to make up the barrel on which the roll is wound, each finger being provided near its root (that is, near the end from which it is supported) with means for receiving the free end of the other finger and urging it towards the axis of the mandrel. This means preferably consists of and will hereinafter be described as one of a pair of co-axial sockets from which the fingers project. The faces of the two fingers which lie adjacent to each other are provided at or near each socket with a projection or projections which maintain a small clearance between these faces of the fingers, even after the free end of each finger has entered the socket associated with the other finger. Thus projections may be formed on the faces of the fingers at or near the roots of the fingers or each finger may have a projection both at or near its free end at or near its root, both co-operating with similar projections on the other fingers, to maintain the desired spacing between the flat faces of the fingers. When a pair of co-operating projections are provided at each of the mandrel in this way, we prefer to make the projections near the roots of the fingers the main projections, providing the greater part of the clearance, and the projections near the free ends of the fingers minor projections. The disposition and height of the projections is such that when the mandrel carries a roll of strip material the fingers are loaded as beams and while the fingers are being withdrawn from the roll they are loaded as cantilevers.

The mandrel is mounted for rotation about its axis and incorporates means for withdrawing the fingers one from the other, in opposite directions along the mandrel axis, to leave a gap between the free ends of the fingers of a width greater than the axial length of the capacitor element and for returning the fingers to a position in which the free end of each finger enters the socket from which the other finger projects. The fingers are preferably of substantially semi-cylindrical cross-section so that when fitted together they form a cylindrical barrel.

The root of each finger is preferably cylindrical, with its axis coinciding with the axis of the barrel, and is preferably a sliding fit in the socket from which the finger projects. With this construction, when the fingers are withdrawn from each other to discharge from the mandrel a roll of material wound on the barrel, the sockets can remain stationary with respect to each other. We prefer to key the fingers to guide tubes integral with or attached to the sockets, to allow for such relative longitudinal movement between the fingers and the sockets while at the same time preventing relative rotation between the fingers and the sockets, about the axis of the barrel. This enables the barrel to be rotated to wind material thereon by rotating the two sockets at the same speed.

As the guide through which the various strips are drawn on to the mandrel, we prefer to use a pair of rollers mounted with their axes parallel to the axes of the supply coils of material from which the various strips are withdrawn, by rotation of the mandrel, the rollers being biassed towards each other to form a nip in which the strips are brought together in the form of a composite strip.

When the capacitor is wound from separate strips of dielectric material, e.g. paper, and conducting material, e.g. metal foil (hereinafter for convenience referred to as paper and metal foil) it is necessary to cut the metal foil strips before cutting the composite strip issuing from the guide (hereinafter referred to as the "nip") to avoid short circuiting between the metal foils at the beginning and the element of the roll forming the capacitor element.

We prefer to carry out this operation as follows. Before the movement of the mandrel away from the nip commences, rotation of the mandrel is stopped, the metal foil strips are clamped and cut on the opposite side of the nip from the mandrel and the mandrel is then rotated through a small number of revolutions, e.g. 2½ revolutions, causing sufficient separation between the cut ends of the metal foils wound on the mandrel and the cut ends of the metal foils still attached to the supply pads. Movement of the mandrel away from the nip then commences, causing the metal foils to be fed forward by a positive feed mechanism until their ends have passed between the paper strips into the nip. The clamp is applied to the composite strip between the ends of the metal foils wound on the roll and the ends of the metal foils in the nip and the last part of the movement of the mandrel away from the nip (and the clamp), and/or further rotation of the mandrel, severs the composite strip between the mandrel and the clamp.

We prefer to feed the metal foil strips into the nip, after cutting, by driving means mechanically coupled to the mandrel support and driven by the movement of this support away from the nip.

It is desirable to secure the free ends of the strips to the body of the roll forming the capacitor element before it is released from the mandrel and we prefer to do this by the application of a wrapping of an adhesive strips. We prefer to use gummed paper strip and to utilise the movement of the mandrel support to feed this strip forward from a source of supply and to cut off an appropriate length or lengths. The strip or strips are preferably wrapped around the capacitor element by further rotation of the mandrel which takes place at or near the end of its movement away from the nip.

It is essential that when this final rotation of the mandrel is completed its angular position with respect to its axis is appropriate for the fitting together of the two parts of the mandrel about the composite strip, held between the clamp and the nip.

Figure 3:
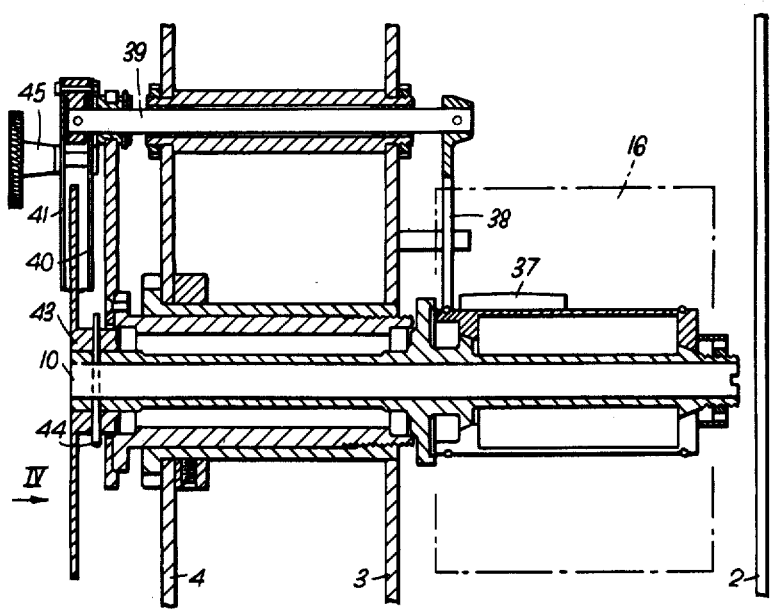
Figure 4:
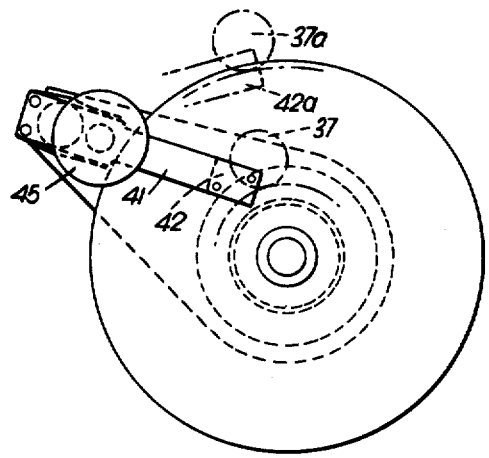
Figure 6:
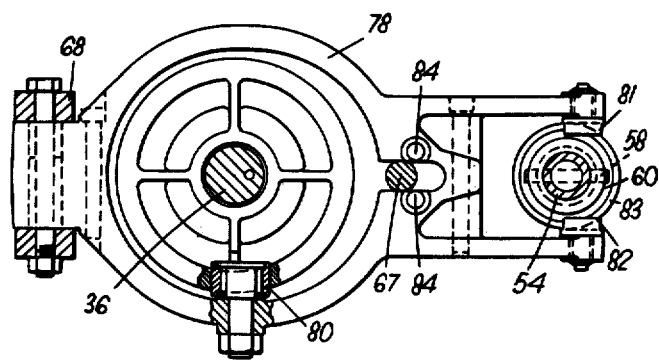
Figure 8:
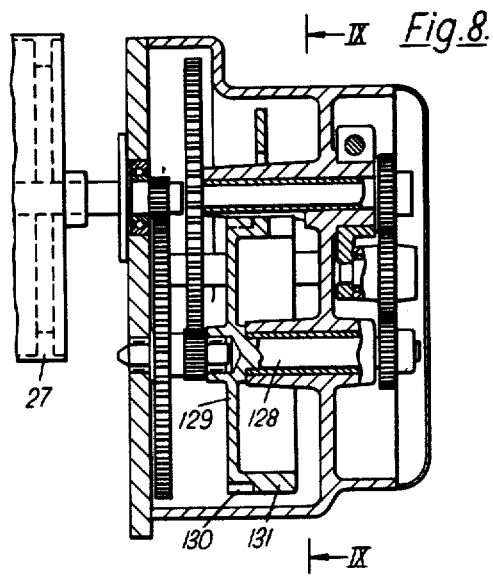
Figure 9:
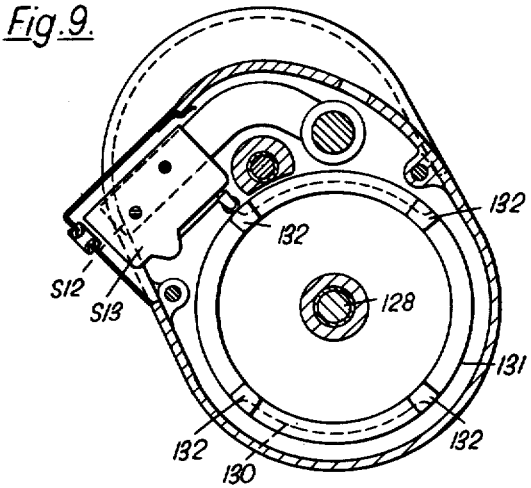
Figure 10:
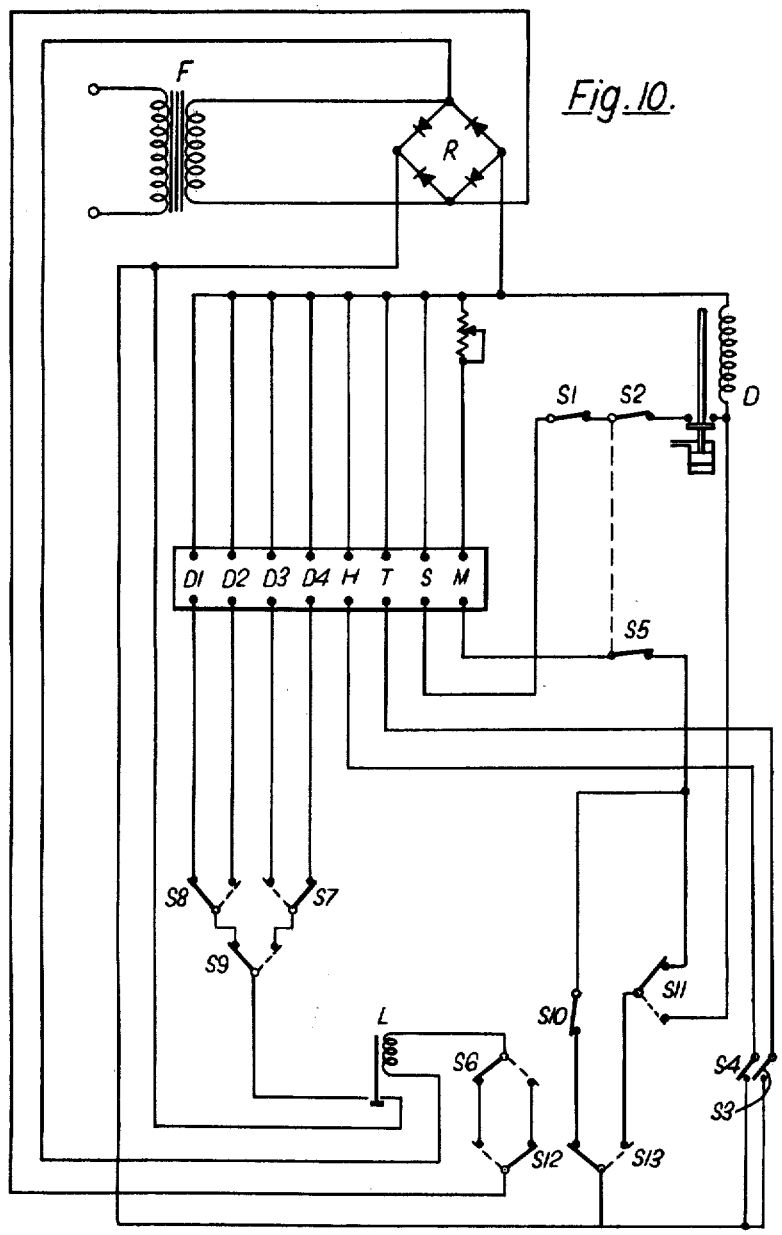
Figure 11:
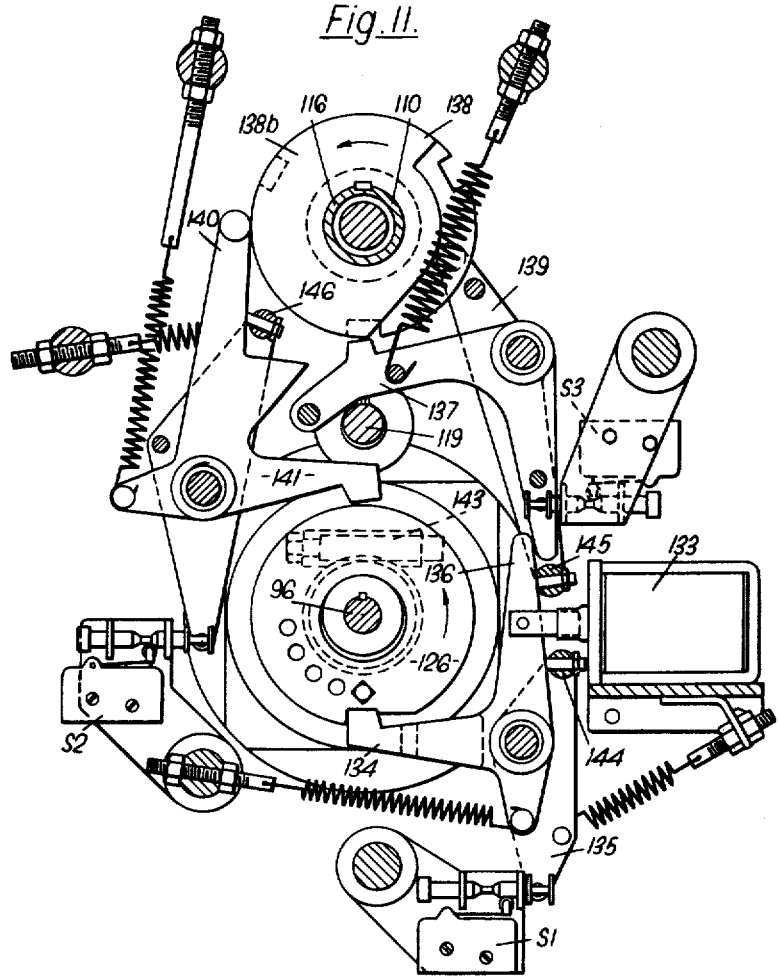
Figure 11A:
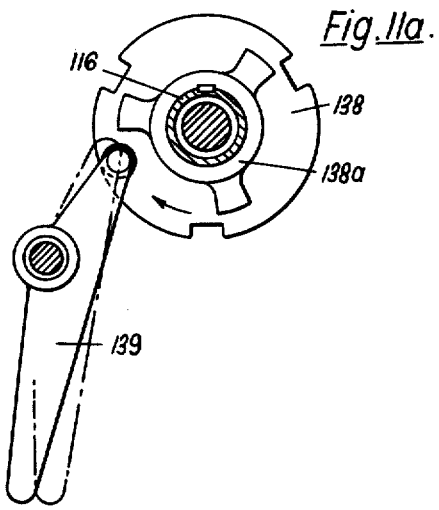
Figure 11B:
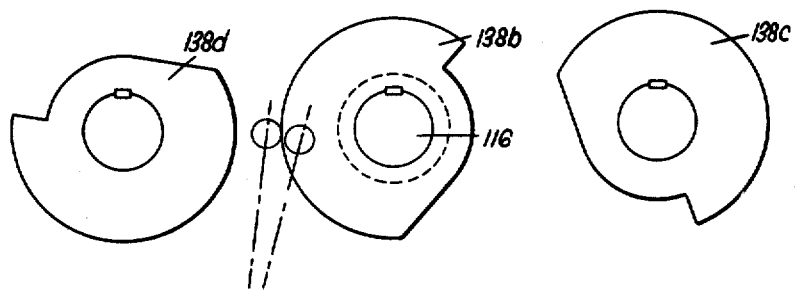
Figure 16A:
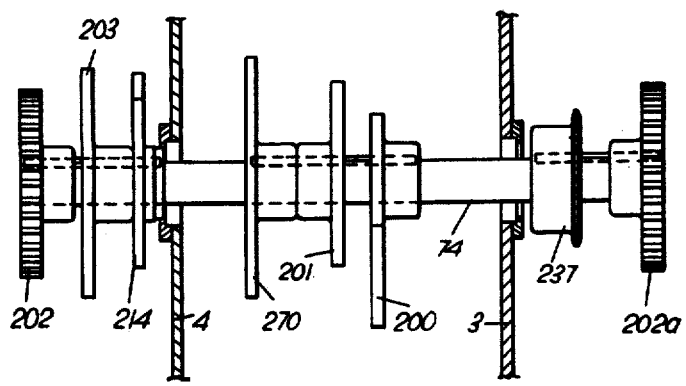
Figure 16B:
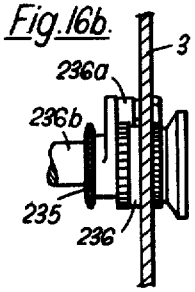
Figure 19:
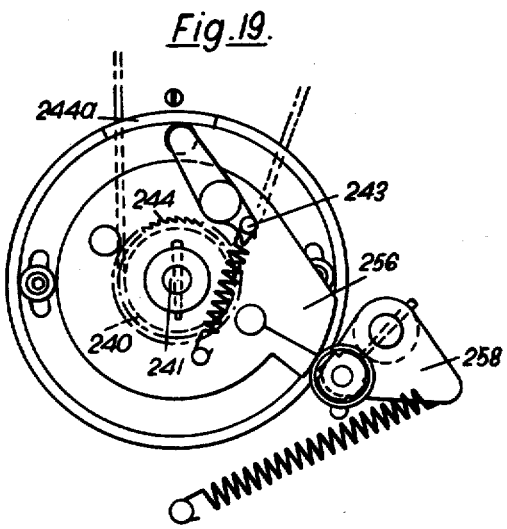
Figure 20:
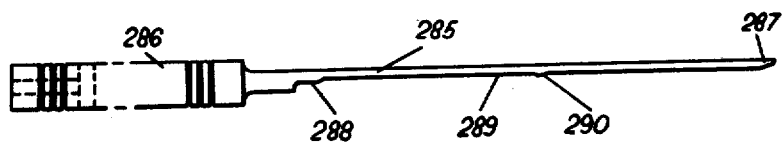
Figure 20A:
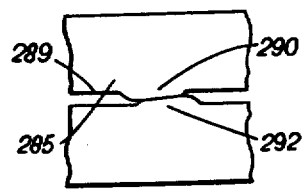

A machine for automatically winding capacitors from strips of paper and metal foil and for automatically inserting terminal tabs in the capacitor element will now be described by way of example with reference to the accompanying drawings, in which:

FIGURE 1 is a side elevation of the machine,
FIGURE 1a is an enlargement of part of FIGURE 1,
FIGURE 2 is an end elevation of the machine seen in the direction II in FIGURE 1,
FIGURE 3 is a sectional elevation through one of the spindles carrying paper strip,
FIGURE 4 is an elevation in the direction IV in FIGURE 3 of part of the mechanism shown in FIGURE 3,
FIGURE 5 is a sectional elevation on the line V—V in FIGURE 1,
FIGURE 5a is an enlargement of a part shown in FIGURE 5,
FIGURE 6 is an elevation of part of the mechanism shown in FIGURE 5,
FIGURE 7 is a sectional elevation of the gear box,
FIGURE 8 is a sectional elevation of timing gear,
FIGURE 9 is a sectional elevation on line IX—IX in FIGURE 8,
FIGURE 10 is a circuit diagram,
FIGURE 11 is a sectional elevation on line XI—XI in FIGURE 7,
FIGURE 11a is an elevation in section of part of the apparatus shown in FIGURE 11,
FIGURE 11b is an elevation of three cams incorporated in the mechanism shown in FIGURE 11,
FIGURE 12 is a sectional elevation on line XII—XII in FIGURE 7,
FIGURE 13 is an elevation of the tab feed mechanism,
FIGURE 14 is a plan of the tab feed mechanism,
FIGURE 15 is a section on line XV—XV in FIGURE 14,
FIGURE 16 is an enlargement of part of FIGURE 1 with certain cover plates removed, FIGURES 16a and 16b are elevations in the direction XVIa, b of parts of the mechanism shown in FIGURE 16.
FIGURE 17 is a plan of the gummed paper strip feed mechanism,
FIGURE 18 is a section on line XVIII—XVIII in FIGURE 17,
FIGURE 19 is an elevation of part of the apparatus shown in FIGURE 18,
FIGURE 20 is an elevation of an alternative form of mandrel finger, and
FIGURE 20a is a detail in section of part of a pair of the fingers shown in FIGURE 20.

The machine is adapted for the automatic insertion of terminal tabs in pairs, one of each pair in contact with each of two electrodes, and the mandrel rotates through an angle of 180°, or less, between the insertion of each tab of a pair. Where, as is usual, more than one pair of tabs is required, the apparatus provides for the mandrel to be stopped always in substantially the same angular position when inserting the first tab of a pair so that, in the finished element, all of these tabs will lie substantially on the same radius in the roll and can thus readily be interconnected, for example by folding them together. Since the angle through which the mandrel is rotated between the insertion of the first and second tabs of a pair is always substantially the same, all of the second tabs will also be similarly aligned.

Capacitor elements of the kind made by the machine are sometimes flattened and the angles and/or angular positions referred to above are adjustable, if necessary, to ensure that the tabs are correctly aligned after such flattening.

The mandrel shaft is positively locked, in each of the angular positions in which it is required to stop, that is for the insertion of tabs and for discharge of a capacitor element, by means of detents acting on detent discs mounted on a shaft mechanically coupled to the mandrel, so as to rotate once for every revolution of the mandrel. This shaft forms part of the drive to the mandrel and is coupled to the power source through a clutch which is released a sufficient time before the detents associated with the tabs and with the discharge of a roll engage with their detent discs, to ensure that the mechanism is not subjected to excessive shock by the engagement of the detent.

A change speed mechanism reduces the speed of the mandrel shortly before it is stopped for the insertion of the first tabs of each pair and at the commencement of the discharge cycle.

The change speed mechanism and the detents for locking the mandrel in position for the insertion of the first tab of each pair are operated under the control of a length measuring device operated by one of the flexible strips being wound on the mandrel.

The sequence of events comprising the insertion of the first tab, the rotation of the mandrel through an angle of 180° or less, the insertion of the second tab and the restarting of the mandrel to continue the winding operation is initiated by the movement of the detent which locks the mandrel in the required position for the insertion of the first tab.

The mechanisms used for inserting the tabs and discharging the capacitor elements are driven from the power source used for driving the mandrel and included in the drive to these mechanisms are auxiliary cam and detent shafts which provide, in conjunction with the detent for locking the mandrel, the control of the sequences referred to in the preceding paragraph.

Referring to FIGURES 1 and 2, the main frame of the machine comprises a base plate 1 and three vertical side plates 2, 3 and 4. The side plates 3 and 4 support bearings for six horizontal spindles 5, 6, 7, 8, 9 and 10 carrying flat rolls of paper strip 11, 12, 13, 14, 15 and 16 hereinafter referred to as pads and two horizontal spindles 17 and 18 carrying flat rolls 19 and 20 of metal foil strip hereinafter referred to as pads. Paper strips P1, P2 from the pads 11 and 12 pass over a guide roller 21 into the nip between a pair of rollers (hereinafter referred to as the "nip rollers") 22 and 23 or simply as the "nip." Similarly the three paper strips P3, P4, P5 from the pads 13—15 pass between a pair of guide rollers 24 into the nip and a single paper strip P6 from the pad 16 passes round a guide roller 25 into the nip. A metal foil strip F1 passes from the pad 19 between a guide roller 26 and a length measuring roller 27 into the nip and a metal foil strip F2 passes from the pad 20 between a pair of guide rollers 28 into the nip.

The composite strip PF thus formed, consisting of paper strips and metal foil strips in the following sequence: two paper strips, one metal foil strip, three paper strips, one metal foil strip, one paper strip, is wound to form a capacitor element on a two part mandrel carried on a pivoted frame 29, the axis of the mandrel being at the position marked 30 in FIGURE 1 during the greater part of the winding operation. The two parts of the mandrel (31 and 32) can be seen in FIGURE 5.

The drive for the mandrel is transmitted from a gear box 33 through a chain 34 and sprocket 35 rotating freely on a spindle 36 about the axis of which the frame 29 pivots in a manner that will hereinafter be described in detail.

The paper strips and metal foil strips are each maintained at substantially constant tension by means of a separate braking arrangement of the kind shown in FIGURES 3 and 4. The spindle shown in these figures is the spindle 10, which carries the paper pad 16. A feeler roller 37 carried at the end of an arm 38 (see also FIGURE 1) rides on the outer circumferential surface of the pad 16. The arm 38 is attached to the end of a spindle 39, to the opposite end of which are attached a pair of spring arms 40 and 41 carrying at their ends braking pads, such as 42 in FIGURE 4, which bears against the opposite surfaces of a braking disc 43 attached to the end of the paper pad spindle 10 by a pin 44. The pressure exerted by the braking pads 42 on the disc 43 is adjustable by means of a knurled knob 45.

The angular spacing between the feeler arm 38 and the brake arm constituted by the pair of spring strips 40 and 41, with respect to the axis of the spindle 39 is such that as the pad spindle 10 rotates the brake arm will tend to approach the spindle axis and the feeler roller 37 will be pressed against the outer surface of the pad 16. As the diameter of the pad 16 decreases and the pair of braking pads 42 approach the axis of the pad spindle 10, the braking torque applied to the spindle 10 is progressively reduced. The arrangement is such as to maintain the tension in the paper strip running from the pad 16 substantially constant.

In FIGURE 4 the roller 37 and braking pad 42 are shown in the positions adopted when the pad 16 is nearly exhausted. The positions they will adopt when a full pad is carried on the spindle 10 are shown dotted at 37*a* and 42*a* respectively.

Referring again in FIGURES 1 and 2, the various guide rollers for the paper strip, the metal foil strip, and the length measuring roller 27 are mounted between the vertical frame plate 3 and a series of plates 46, 47, 48 and 49 which also support a pair of similar mechanisms, each mounted in the path of one of the metal strips, for clamping the foil, cutting it and then feeding the part of the foil still issuing from the pad forward into the nip, between the paper strips. These mechanisms are driven partly by the rocking of the mandrel frame 29 about the spindle 36 and partly by the drive mechanism for rocking the mandrel frame.

The frame 29 carrying the mandrel pivots about the spindle 36 (which is parallel to the mandrel) through an angle of approximately 40° to draw the mandrel away from the nip and then return to its original position immediately below the nip in which the capacitor element is wound. By mechanisms that will be described in detail later, after the completion of the movement of the mandrel away from the nip, a cam arrangement mounted on the frame draws the two parts of the mandrel axially away from each other, in such a way that in the extreme lower position of the frame the capacitor element is released from the mandrel, and after completion of the return movement of the frame, the two parts of the mandrel are brought together again, by the same cam mechanism, one on each side of a length of composite strip from which the next capacitor element is to be wound. This pivoting movement of the mandrel is brought about by one revolution of a cam shaft connected in a manner which will hereinafter be described to a single driving motor for the machine. This cam shaft will hereinafter be referred to as the "mandrel frame cam shaft."

During the single rotation of the mandrel frame cam shaft the following events take place in the following sequence—rotation of the mandrel ceases; the metal foils are clamped; the metal foils are cut; the mandrel is rotated through two and a half revolutions; the mandrel moves to its lower position, feeding the metal foils forward into the nip and at the same time a gummed strip for securing the element is fed forward wetted and cut; the element on the mandrel makes contact with the ends of the gummed strips, the composite strip between the mandrel and the nip is clamped by a clamping device, which also cuts the composite strip; the mandrel rotates through one and a half revolutions to secure the gummed strips to the element; the element is released from the mandrel by separation of the two parts of the mandrel; the mandrel moves upwards again to its upper position and the two parts and the mandrel are brought together again one on each side of the composite strip between the nip and the clamp for the composite strip; the clamp on the composite strip is released and rotation of the mandrel to wind another roll commences.

Immediately above the nip on each side of the group of three paper strips which separate the two metal foil strips is one of a pair of feeders 50 and 51 by which terminal tabs are fed between the metal and paper strips into the nip. The construction of these feeders and the way in which they release the tabs will be described in detail later.

At the commencement of an operation for manufacturing a series of capacitor elements the paper and foil strips are threaded by hand, between and around the various guides already described, into the nip and the end of the composite paper/metal strip issuing below the nip is attached to the mandrel which will now be described with reference to FIGURES 5, 5*a* and 6.

The mandrel comprises two fingers 31 and 32 of semicircular cross-section mounted with a clearance 0.026" between their flat faces to form a barrel of diameter 0.6" on which the capacitor element is wound. Each finger is integral with and projects from a cylindrical support (52, 53) which slides in a guide tube (54, 55). The guide tubes 54 and 55 carry at their adjacent ends sockets 56 and 57 into which the free ends of the fingers 31 and 32 fit when the two fingers are juxtaposed to form the barrel on which the capacitor element is wound. The fingers 31 and 32 can move axially with respect to the guide tubes 54 and 55 but are prevented from rotating with respect to them by pins 58 and 59 passing through the cylindrical supports 52 and 53, through slots in the guide tubes 54 and 55 into a pair of sleeves 60 and 61, which are themselves free to slide longitudinally along the guide tubes.

The guide tubes 54 and 55 are rotated in unison by pinions 62 and 63 driven by a pair of pinions 64 and 65 carried on a hollow shaft 66 running freely on a fixed spindle 67. The guide tubes 54 and 55 are carried in bearings mounted on two pairs of side plates 68, 69 and 70, 71, all attached to the main spindle 36

(see also FIGURE 1), about the axis of which the assembly pivots, and to the spindle 67. This assembly was referred to generally as a frame 29 in the description of FIGURE 1.

The mandrel is driven, through the pinions 62–65, already described, by a pinion 35a on the chain sprocket 35, which runs freely about the spindle 36.

The mandrel frame 29 can be caused to rock about the axis of the spindle 36 by a pair of conjugate cams 200 and 201 against which a pair of followers 72 and 73 bear. By the action of these cams (which are carried on the mandrel frame cam shaft 74, FIGURE 1), the frame can be made to move through about 40° from the position shown in FIGURE 1 to a position in which the axis 30 of the mandrel is in the position marked 75 (in FIGURE 1). At the end of this movement the fingers 31 and 32 forming the mandrel are moved apart by a mechanism which will now be described with reference to FIGURES 5 and 6. This mechanism comprises a pair of double acting cylindrical cams 76 and 77 mounted on the spindle 36 and each acting on a pair of followers carried by one of two operating arms 78 and 79. One of these operating arms is shown in elevation in FIGURE 6, and in this figure part of the arm is sectionalised to show one of the followers (80). One end of the arm 78 is pivoted to a side plate 68 of the frame 29 and the other end carries a pair of freely rotating slotted jaws 81 and 82. A floating ring 83 carried on the sleeve 60 rides in the slots in the jaws 81 and 82 in such a way that as the operating arm 78 moves under the influence of the cam 76, the sleeve 60 is moved along the guide tube 54, thus withdrawing the finger 32 completely into the guide tube. During the latter part of this movement a pair of stops 84 carried on the operating arm 78 come into contact with a spring loaded sleeve 85 sliding on the fixed spindle 67.

The operating arm 79 is identical with arm 78 and functions in exactly the same way under the action of the cam 77. When the mandrel approaches the position 75 shown in FIGURE 1, the fingers 31 and 32 are withdrawn completely into the guide tubes 54 and 55 to release a capacitor element wound on the mandrel and after the mandrel returns from the position 75 to the position 30 in FIGURE 1 the two fingers are again brought together to the position shown in FIGURE 5 in which their free ends fit into the sockets 56 and 57.

Each finger is provided in its flat face near where the finger projects from the socket with a hardened steel insert 86, 87, hereinafter referred to as the anvil, which projects to a maximum distance of .024" from the finger. The projecting surface of the anvil is rounded in such a way that, as the free end of the other finger enters the socket from which the first projects, the flat faces of the fingers are gradually forced apart as the tapered part at the end of the flat face of the finger entering the socket runs up the rounded part of the anvil. The part of the flat face at the end of each finger which makes contact with the anvil on the other finger is provided with a disc shaped insert 88, 89, hereinafter referred to as "the button," which projects by .002" from the flat face. This insert is fitted before the taper is machined on the end of the flat face of the finger so that where the button extends on to the tapered part it will be machined flush with the tapered part.

The arrangement is such that when the fingers 31 and 32 are in a position to form the barrel of the mandrel, that is, with the free ends of each finger fitting into the socket (56 and 57) associated with the other finger, the flat part of the button (88, 89) will rest against the anvil (86, 78) and the flat faces of the two fingers, between the two co-operating pairs of buttons and anvils, will be spaced apart by .026".

When strip material is wound on the barrel to form a capacitor element, the fingers will be loaded as beams, the load being substantially uniformly distributed over the length of the barrel to which the strip is applied. As the two fingers are being withdrawn from the finished element, they will be loaded as cantilevers, immediately the anvils have moved free from the buttons.

Referring to FIGURE 5a, it will be seen that the finger 32 is formed with a groove housing a thin leaf spring 32a shaped in such a way that a central arcuate part projects a short distance from the flat face of the finger. The groove is of rectangular cross-section and occupies approximately half the width of said flat face. The spring 32a functions to grip a strip or composite strip of flexible material passing between the two fingers but is not sufficiently strong to damage the strip or composite strip as the two fingers are withdrawn from a roll of the material wound on the barrel.

The fingers can readily be brought together one on each side of the strip or composite strip of material to be wound on the barrel in such a way that, when the end of each finger has entered the socket associated with the other finger, the material is trapped between the fingers and winding of the material on the barrel can commence.

The cylindrical cams 76 and 77 are driven through pinions 90 and 91 in a manner that will hereinafter be described. During the rocking movement of the frame 29 about the axis of the spindle 36 this spindle rotates through 40° and this movement is utilised to drive two other mechanisms through sprockets 92 and 93. The sprocket 92 drives the metal foil feed in a manner which will hereinafter be described in detail and the sprocket 93 drives the gummed strip feed in a manner which will hereinafter be described in detail.

The whole machine is driven from a single electric motor through the gear box 33 (FIGURE 1) which is shown in sectional elevation in FIGURE 7. Referring to FIGURE 7, the motor (not shown) is coupled by a belt to the pulley 94 in such a way that this pulley rotates at a constant speed of 600 r.p.m. The pulley can be directly coupled through a magnetic clutch 95 to a shaft 96, which will be referred to as the main detent shaft. On this shaft is a sprocket 97 (which can also be seen in FIGURE 1) that is coupled by a chain to the sprocket 35 which drives the mandrel, through a gear train already described with reference to FIGURE 5. The gear train is such that the mandrel rotates at the same speed as the main detent shaft 96, that is at 600 r.p.m. when the magnetic clutch 95 (the main drive clutch) is energised. The pulley 94 is also permanently coupled through pinions 98 and 99 to a lay shaft 100 which rotates at 200 r.p.m. The lay shaft 100 is coupled through pinions 101 and 102 to a second magnetic clutch 103 (the slow drive clutch) which when energised drives the main detent shaft 96 at 60 r.p.m. and hence drives the mandrel at 60 r.p.m. The control circuit is such that clutches 95 and 103 cannot be simultaneously energised. The pinion 102, which is constantly rotating at 60 r.p.m., is carried on a shaft 104 carrying two further magnetic clutches 105 and 106. When the clutch 106 (the tab feed clutch) is energised a sprocket 107 is driven at 20 r.p.m. through pinions 108 and 109. This sprocket drives the tab feed mechanism, which will be described in detail later.

When the clutch 105 (the discharge head clutch) is energised it drives a shaft 110 at 5 r.p.m. through pinions 111, 112, 113 and 114. The shaft 110 carries at its end a sprocket 115 (see also FIGURE 1) which drives the mandrel frame cam shaft 74. The shaft 110 will hereinafter be referred to as "the discharge auxiliary detent shaft." It is coaxial with a "tab feed auxiliary detent shaft" 116 driven through pinions 117 and 118 from a shaft 119 that transmits the drive from the pinion 109 to the tab feed sprocket 107.

The main detent shaft 96 carries a series of three pairs of detent discs 121, 122: 123, 124: and 125, 126: and a single detent disc 127. The three pairs are associated with the insertion of three sets of terminal tabs and the single disc 127 is associated with the discharge of a completed capacitor.

Associated with the detent discs are detents operated by solenoids under the control of a length measuring device G mounted on the plate 46 and driven by the roller 27 (FIGURE 1) which bears against and is driven by one of the metal foil strips F1. The length measuring roller 27 (see also FIGURES 8 and 9) is coupled through gear train to a cam shaft 128 in such a way that the cam shaft (the timing shaft) is rotated once when sufficient foil passes through the nip to manufacture one capacitor. A cam 129 on the timing shaft 128 has two tracks one of which controls a two-way switch for energising the detent solenoids and the other of which controls a change-over switch for changing the speed of the drive to the mandrel by energising and de-energising magnetic clutches 95 and 103, i.e. the main drive and slow drive clutches. The electrical circuit is shown in FIGURE 10. A two-way switch S12 (FIGURE 10) is associated with the left hand track 130 on the cam 129 and a change-over switch S13 (controlling the main drive and slow drive clutches) is associated with the right hand track 131.

The track 131 on the timing shaft cam which controls the switch S13 has four ears 132, each of which is effective to operate the switch S13 shortly before the change-over switch S12 is operated.

When the switch S13 is in the position shown in FIGURE 10, current is supplied from the transformer F and rectifier R to a pair of terminals M, to which the main drive clutch is connected. The changeover of the switch S13 (to the right hand position in FIGURE 10) breaks the power supply to the main drive clutch and, assuming that switch S11 is in the lower (normal) position, energises the coil of a relay relay D. After a few seconds, the relay D completes a power supply circuit to a pair of terminals S to which the slow drive clutch is connected. The change-over switch S12 is then operated by the track 130 on the cam on the timing shaft to energise one of the four main detent solenoids (which are connected to the terminals D1, D2, D3, D4).

The sequence of operations for the insertion of a tab is as follows. It is assumed that the mandrel is rotating at 600 r.p.m. and that no tabs have so far been inserted in the element being wound. When one of the ears 132 on the track of the cam on the timing shaft associated with switch S13 reaches a position which indicates that a sufficient length of the composite strip has been wound on to the mandrel, the switch S13 is operated to open the main drive clutch and close the slow drive clutch after a few seconds delay as described above in order to allow the pad spindles to decelerate, and the mandrel speed is reduced to 60 r.p.m. After a suitable interval, the other cam surface 130 on the timing shaft cam 129 operates the two-way switch S12.

When the two-way switch S12 is operated, a solenoid for moving a detent associated with the detent disc 125 is energised through terminals D1, switches S8 and S9 being in the position shown in FIGURE 10. This detent and its associated mechanism is shown in FIGURES 11, 11a and 11b.

In a manner which will be described later, the first change-over of the two-way switch S12 energises the solenoid 133 (FIGURE 11) through the terminals D1 to cause a detent 134, hereinafter referred to as the main lower detent, to approach its detent disc 126. During the first part of this movement, a linkage 135 is rotated in a clockwise direction (as seen in FIGURE 11) to operate a switch S1, the switch being operated just before the detent comes into contact with the detent disc 126 to open the slow drive clutch so that when the detent engages fully with the slot the main detent shaft will no longer be driven and engagement of the detent with the slot will not cause an excessive shock in the mechanism. An extension 136 on the detent 134 operates a detent 137 by which the tab feed auxiliary detent shaft 116 is locked through detent disc 138. An extension on the detent 137 closes a switch S3 to energise the tab feed clutch 106 (which is connected to terminals T, FIGURE 10) so that the tab feed drive shaft 119 and the tab feed auxiliary detent shaft 116 both commence to rotate. During the first part of the movement of the tab feed drive shaft, one tab is fed into the capacitor element, in a manner that will be described later in detail, by means of one of the tab feeders 50 and 51 (FIGURE 1). When this operation is completed a cam 138a (FIGURE 11a) on the auxiliary detent shaft 116 operates a linkage 139 (see also FIGURE 11) to release the first main lower detent 134 and hence to close the switch S1 to re-energise the slow drive clutch and drive the mandrel at 60 r.p.m. After further rotation of the shaft 116, a cam 138b (see FIGURE 11b) allows a follower 140 to move in a clockwise direction to allow an upper main detent 141 to move towards the detent disc 125 associated with the disc 126. Shortly before the detent 141 engages with the notch in this disc the switch S2 is operated to open the slow drive clutch and thus allow the main detent shaft, and hence the mandrel, to be brought to rest by engagement of the detent 141 with the disc 125. The arrangement is such that the mandrel rotates through about 180° to provide the desired spacing between the two tabs but this angle can be adjusted in a manner to be described later. The auxiliary detent shaft continues to rotate and a second terminal tab is fed into the nip. Rotation of the auxiliary detent shaft will continue until the auxiliary detent 137 drops into the next notch in the disc 138, that is after the disc 138 and the auxiliary detent shaft has rotated through 120°. Movement of the detent 137 into the notch releases the upper main detent 141 to free the main detent shaft. A short time afterwards the cam surface 130 on the timing shaft (FIGURES 8 and 9) will have moved the switch S13 to the left (FIGURE 10) to complete the power circuit to the main drive clutch through terminals M and cause the mandrel to rotate at full speed.

During the whole of the sequence described, the tab feed auxiliary detent shaft 116 has rotated through one third of a revolution and the shaft 119 driving the tab feed has rotated through one revolution. The detent disc 138 on the tab feed auxiliary detent shaft has three notches and the cam 138a on the auxiliary detent shaft which operates the mechanism to lower the lower main detents has three tongues one corresponding to each pair of detent discs on the main detent shaft. Also there are three cams 138b, 138c and 138d (FIGURE 11b) each for releasing one of the three upper main detents (such as 141). Thus there is provision for the insertion of three pairs of tabs in the capacitor element.

The spacing between the tabs of each pair can be altered by an adjustment between the relative positions of the detent discs of each pair mounted on the main detent shaft. Referring to FIGURE 7, it will be seen that the discs 122, 124 and 126 are bolted to the discs 121, 123 and 125 and from FIGURE 11 it will be seen that several bolt holes are provided to allow for the necessary adjustment. Also where it is necessary to insert the subsequent pairs of tabs on different radii about the capacitor element axis (to compensate for the effects of subsequent flattening of the element and tightening of the roll forming the element during winding) an adjustment can be made to the relative positions of the three pairs of detent discs on the main detent shaft by means of screws 142 and 143 on two of the pairs.

The same sequences of operations will be repeated when the next ear 132 on the cam 129 associated with the timing shaft again changes over the drive from the main drive clutch to the slow drive clutch through switch S13 and the two-way switch S12 is operated to energise another of the solenoids (D1–D4) associated with the lower main detents.

All four lower main detents operate, through a push bar 144, the same switch S1 for de-energising the slow drive clutch. Similarly the right hand linkages (FIGURE 11) such as 139 associated with the cam 138a on the auxiliary detent shaft can knock out any of the lower main detents by a common push bar 145 and the linkage associated with each of the three upper main detents can operate through a common push bar 146 a switch S2 for de-energising the slow drive clutch 103.

It has been mentioned that the single two-way switch S12, associated with the timing shaft, energises in sequence the three solenoids associated with the three lower main detents, to start the sequence of operations resulting in a pair of tabs being inserted at a predetermined angular spacing, and a fourth solenoid associated with the discharge mechanism. To ensure that these four solenoids are energised in sequence the power for energising the solenoids is fed via a relay L (FIGURE 10) through the two-way switch S12 and through three further two-way switches S7–S9 actuated by cams 147, 148, 149 mounted on a shaft 152 ("the selector cam shaft") driven from the tab feed auxiliary detent shaft 116 and from the discharge auxiliary detent shaft 110 (see FIGURE 7). This latter shaft rotates once during the complete discharge cycle, on being coupled by the discharge clutch 105 to the main drive. The selector cam shaft 152 is coupled through a differential gear 153–156 both to the tab feed auxiliary detent shaft 110 through a pinion 157 and to the discharge auxiliary detent shaft 116 through a pinion 158 in such a way that, during one revolution of the tab feed auxiliary detent shaft 116, the selector cam shaft 152 is driven through three quarters of a revolution by one side 155 of the differential and, during one revolution of the discharge auxiliary detent shaft 110, it is driven through the remaining quarter of a revolution, through the other side 154 of the differential by means of planet pinions 156 carried on a disc 159.

The three switches S7–S9 are operated by cams 147, 148, 149 on the selector cam shaft 152 in such a way that, prior to the change-over of switch S1, the supply circuit to the solenoid next due to be energised is pre-set. After each solenoid has been energised for an appropriate interval, its supply circuit is broken by switch S6, which is operated by another cam 146 on the selector cam shaft 152. In FIGURE 10 the circuits are shown as pre-set for the energisation of solenoid 133 (associated with the first main detent 126) which is connected to terminals D1. The next sequence of events will be the change-over of switch S12 to energise solenoid 133, the change-over of switch S6 to de-energise solenoid 133 and finally switch S8 changes over to pre-set the power supply circuit to a solenoid connected to terminals D2 operating a solenoid and detent associated with disc 124. Thus, by the first three-quarters of a revolution of the selector cam shaft, circuits to the second and third solenoid and then the discharge solenoid 160 (FIGURE 12) are pre-set in succession, through terminals D2, D3 and D4, and during the last quarter of a revolution (while the selector cam shaft is being driven by the discharge mechanism) the circuit to the first solenoid 133 is set (the position shown in the drawing) through terminals D1.

The selector cam shaft 152 is stationary during greater part of the winding cycle and it can rest only in one of four positions, at 90° to each other. It moves from one position to the other only during a tab feed sequence and during the discharge sequence. A further cam 150, in the form of a disc with four notches in its rim at 90° to each other, allows switch S10 in the main drive clutch circuit to close only when the selector shaft 152 is in one of these four resting positions. The width of each notch is such that S10 cannot close and the mandrel cannot be driven at full speed during a tab feed or discharge sequence.

The apparatus is designed for the insertion of three pairs of tabs but it can be adapted for the insertion of two pairs only, simply by providing (in a manner which will be described later) for the tab feed mechanism to be put out of action during the time when it would normally be feeding the second pair of tabs on to the tab feeders. This has the disadvantage, however, that the mandrel is still slowed and stopped, nominally for the insertion of the second pair of tabs, and time is wasted. This waste of time can be avoided in the following way. Switch S11 is operated by a cam 151 on the selector shaft in the form of a circular disc with a 90° section (161) of its rim made detachable. This section corresponds to the period for the insertion of the second pair of tabs and when it is removed it allows the switch S11 to move from its normal (lower) position to its upper position (as shown in FIGURE 10) where it remains during the whole of this period. It will be seen that in this condition, when switch S13 moves from the fast drive to the slow drive position, instead of energising the slow drive clutch 103, the main drive clutch 95 is maintained energised and the mandrel will continue to rotate at full speed. When this section 161 of the cam 151 is removed, it is also necessary to remove an equivalent section from the cam 150 operating switch S10 and also to put the main and auxiliary detents, associated with the second pair of tabs, out of action. This is done by removing the end of the appropriate main lower detent (since it is necessary that its linkage should continue to function) and arranging a stop (not shown) to prevent the corresponding main upper detent from engaging its detent disc. Since S10 is now by-passed and cannot prevent premature change over to fast drive at the end of the first tab cycle, a further switch S5 in the main clutch circuit is mechanically coupled to switch S2 so that it is only closed when switch S2 closes at the end of the tab feed cycle.

As already mentioned, the tab feed mechanism is operated by one rotation of a shaft 119 coupled to the tab feed auxiliary detent shaft 116. The tab feeders 50 and 51 are in the form of parallel cranked rods projecting, parallel to the nip rolls 22, 23, one on each side of the group of three paper strips P3, P4, P5 which separate the first metal foil strip F1 from the second metal foil strip F2. In the region in which they pass between the strips of paper and foil, the feeders are longitudinally notched in such a way as to leave a flat horizontal platform bounded by a vertical wall, the vertical walls both facing the group of three paper strips, which at this stage are in contact (as seen in FIGURE 1).

The mechanism for feeding tabs onto the tab feeders 50 and 51 and for rotating the feeders to allow the tabs to fall between the paper and foil strips will now be described with reference to FIGURES 13, 14 and 15. Referring to these figures, the mechanism is driven by a sprocket 170 which is coupled by a chain to the sprocket 107 on the gear box (FIGURE 7) in such a way that these two sprockets rotate at the same speed. In other words during the feeding of one pair of tabs the sprocket 170 makes one complete revolution. The sprocket 170 is mounted on a hollow cam shaft 171 which rotates about a drive shaft 172 coupled by bevel gears 173 to upper drive rollers 174 for feeding narrow metal foil strip 174a from a pair of supply pads one of which can be seen at 175 in FIGURE 13 under spring fingers 175a, on to the horizontal platforms (50a, 51a) of the tab feeders 50 and 51. The shaft 172 is driven during only the first part of the single rotation of this hollow shaft 171, by means of a pawl 176 engaging with a ratchet wheel 177 mechanically coupled to the shaft 172. The duration of the engagement between the pawl 176 and ratchet wheel 177 can be adjusted, to adjust the length of the narrow metal foil strips fed on to the tab feeders 50 and 51, by means of an adjustable shroud 178 adapted to hold the pawl 176 out of engagement with the ratchet wheel 177 (as it is in FIGURE 14). The ratchet wheel 177 drives the shaft 172 through planet gears 179 and a sun pinion 180.

After sufficient strip has been fed to the tab feeders 50 and 51, a knife blade 181 is operated through a cam 182 on the cam shaft 171 through a follower 183 and a shaft 184. A second cam 185 on the cam shaft 171 operates on a follower 186 (see FIGURE 15) to rotate a pinion 186*a*, mounted on the same shaft as the follower 186 (see FIGURE 13). The pinion 186*a* engages with two pinions 50*b* and 51*b* which as shown in FIGURE 14 are axially staggered from each other so that they do not interengage. The pinions 50*b* and 51*b* are carried on the feeders 50 and 51 respectively.

As shown in FIGURE 15, the cam 185 is rotating in an anti-clockwise direction through a neutral position in which the feeders have the attitude shown in the drawings. After rotating through 135° from the position shown in FIGURE 15 the cam 185 allows the follower 186 (and the pinion 186*a*) to rotate, during the next 45° of rotation of the cam, in an anti-clockwise direction (as shown in FIGURE 15) causing both feeders to rotate through 45° in a clockwise direction, viewed as in FIGURE 15 (that is anti-clockwise as viewed in FIGURES 1 and 1*a*). The feeders remain in this position while the cam 185 rotates further through 135°, after which the peaked step on the cam strikes the follower 186 and rotates in a clockwise direction as viewed in FIGURE 15 through an angle such that the feeders 50 and 51 both rotate simultaneously through 90° (in a clockwise direction as viewed in FIGURES 1 and 1*a*). The first 45° of this rotation brings the feeders back to the "neutral" position shown in the drawings and the remainder is a 45° rotation in the opposite direction to the first described 45° rotation from the neutral position. Finally the follower 186 and hence the feeders return to the position shown in the drawings. Looking at FIGURE 1 it will be seen that when the two tab feeders rotate through 45° anti-clockwise from the neutral position, the tab will fall from the feeder 50 only and when they rotate clockwise from the neutral position through 45°, the tab will fall from the feeder 51. These operations are so timed that the rotation of the mandrel through about 180°, as has already been described, takes place between the feeding of the first tab and the feeding of the second tab. For simplicity the follower 183 has been omitted from FIGURE 15.

As already described above the machine can be adapted when required to feed only two pairs of tabs into each capacitor roll and when it is required to operate in this way the tab feed mechanism is modified (as shown in the drawings) in the following way. A helical gear wheel 187 on the cam shaft 171 (FIGURE 14) rotates a horizontal shaft 188 carrying a cam 189 at a speed such that the shaft 188 makes one third of a revolution for each complete revolution of the drive sprocket 170. During every third revolution of the driving sprocket the cam 189 rocks a lever 190 to move a lower feed roller 190*a* out of contact with the upper feed roller 174. When this takes place the narrow metal foil strips are not fed to the feeders 50 and 51 and, although the mechanism functions otherwise in the manner described above, no tabs are fed into the nip. It will be noted that the feeders 50 and 51 are cranked as at 191 (FIGURE 13) to leave a space for the feed roller 190*a*.

As already mentioned in addition to three pairs of detent discs 121, 122: 123, 124: 125, 126: the main detent shaft carries a detent disc 127. As seen in FIGURE 12, the disc 127 has two notches with which a detent 195, "the main discharge detent," can engage. The notches are diametrically opposite to one another and the arrangement is such that, when the detent 195 is in engagement with one or other of the notches, the faces of the two fingers 31 and 32 of the mandrel will be parallel to the composite strip issuing from the nip when the mandrel is in a position for winding a capacitor element, that is, when the mandrel frame 29 is in its highest position. The main discharge detent 195 is operated by the solenoid 160 in the following way.

After appropriate lengths of metal and paper strip have been wound on the mandrel the fourth ear 132 of the cam surface 131 on the timing shaft cam (FIGURES 8 and 9) controls the operation of the main drive clutch and the slow drive clutch in such a way as to reduce the speed of the mandrel from 600 to 60 r.p.m. immediately before it is stopped completely and anchored by engagement between the detent 195 and one of the notches in the detent disc 127.

This is effected as follows. The switch S13 on the timing shaft opens the main drive clutch and closes the slow drive clutch. The switch S12 on the timing shaft completes a connection through S6, S7 and S9 and terminals D4 to cause the solenoid 160 to draw the main discharge detent 195 towards the detent disc 127. A linkage 196 associated with the detent operates the switch S1 (by means, not shown, similar to that shown in FIGURE 11) to open the slow drive clutch just before the detent falls into the notch. The discharge auxiliary detent shaft 110, which is mechanically coupled to the mandrel frame cam shaft 74, carries a detent disc 197 with a single notch and a cam 197*a* As the main detent 195 moves into a notch in its disc 127 a linkage 198 withdraws a detent 199 from the disc 197 on the auxiliary detent shaft and closes a switch S4 to energise the discharge head clutch 105 through terminals H (FIGURE 10). This causes the discharge auxiliary detent shaft 110 and hence the mandrel frame cam shaft 74 to commence to rotate at 5 r.p.m. After rotation of the discharge auxiliary detent shaft through about 20° the cam 197*a* on this shaft operates a linkage 200 to release the main detent 195 and close the switch S1 which energises the slow drive clutch, thus causing the mandrel to rotate at 60 r.p.m. The length of the operative surface on the cam is such that shortly before the mandrel has completed two and a half revolutions the main detent is released and bears against the rim of the main detent disc. As soon as the mandrel has completed two and a half revolutions the main detent begins to move into the second slot in the detent disc 127, the switch controlling the slow drive clutch is operated to open this clutch and the mandrel is finally stopped in the required position by the detent falling completely into the notch in the detent disc. Further rotation of the auxiliary detent shaft brings another part of the cam 197*a* into contact with the follower which operates the linkage 200 for knocking the main detent 195 out of contact with the main detent disc 127. The operative surface of this part of the cam is of a length such that by a similar sequence of operations the mandrel is rotated through one and a half revolutions.

When the discharge auxiliary detent shaft has completed one revolution the detent 199 falls into the single notch in the detent disc 197 and the linkage associated with this detent operates the switch S4 to open the discharge head magnetic clutch so that rotation of the auxiliary detent shaft, and hence the mandrel frame cam shaft, ceases and to release the lower main detent. Thus during the single revolution of the mandrel frame cam shaft which is initiated by the length measuring device, the mandrel is, after an interval, rotated through two and a half revolutions and after a further interval rotated through one and a half revolutions and on completion of the one and a half revolutions the mandrel is locked in a position such that flat faces of the two fingers 31, 32 of the mandrel will, when the mandrel frame 29 returns to its uppermost position, be parallel with the composite strip PF issuing from the nip.

The sequence of operations controlled by the single revolution of the mandrel frame cam shaft 74 will now be described with reference to FIGURES 16 and 16*a*. In these drawings the plates 46–49 (FIGURE 1) have been removed to reveal the mechanism mounted beneath them. Mounted on the cam shaft 74 are two cams 200 and 201 which form a conjugate pair and co-operate with the followers 72, 73 mounted on the main pivot 36 for the mandrel frame (see also FIGURE 5). These cams are so shaped that immediately after the mandrel has completed its first rotation in the discharge cycle (that is through two and a half revolutions) the mandrel frame 29 is rotated in a direction to move the mandrel away from the nip and this movement of the mandrel continues until the mandrel reaches its lower position; after the second rotation of the mandrel (through one and a half revolutions) the mandrel is moved back to its original position.

A pair of pinions 202 and 202a on the mandrel frame cam shaft mesh with pinions 90, 91 by which the cylindrical cams 76, 77 (FIGURE 5) are driven to draw the two halves of the mandrel apart, to the extent necessary to release the wound capacitor, when the mandrel is furthest from the nip, and bring them together again in the winding position, when the mandrel returns to its original position adjacent the nip.

A further cam 203 on the mandrel frame cam shaft acts through linkages 204–208 to cause two pairs of driving rollers 210–213, each of which pairs acts on one of the metal foils at a point just before it enters the nip, to clamp the two metal foils. This clamping is effected immediately the rotation of the cam shaft 74 commences. A further cam 214 on the shaft 74 operates two pairs of shear blades 215–218 arranged to cut the foils between the driving rollers and the nip, shortly after clamping has been effected. A follower arm 219, running on the cam 214, drives a pinion 220 engaging with a similar pinion 221; attached to the pinions 221, 220 are arms 222, 223 carrying the knives 215, 216. Arms 224, 225 are similarly actuated through linkages 226–228. It is at this point of the rotation of the cam shaft (and of the auxiliary detent shaft to which it is coupled) that the rotation of the mandrel through two and a half revolutions commences. During this rotation only the paper strips are drawn through the nip, the cut foil strips F1 and F2 being held between the driving rollers 210–213. After this rotation of the mandrel ceases the driving rollers 210–213 are driven through pinion trains 229–232 and 229, 233, 234 by a chain drive from the sprocket 92 on the main pivot for the mandrel frame to a sprocket 235, through a pawl and ratchet device 236 (FIGURE 16b). A pawl 236a is only allowed to make contact with the ratchet during part of the movement of the mandrel frame and the angle of rotation during which it is allowed to make contact can be varied by means of an adjustable shroud so that the angle through which the shaft 236b and pinion 229 rotate, and hence the length of foil fed forward at this stage, can be controlled. After the forward drive of the foil ceases the clamping effect of the driving rollers is released by movement of the follower 204 so that the metal foils can be drawn forward by rotation of the mandrel.

The mandrel frame cam shaft is driven by a sprocket 237 coupled to the sprocket 115 on the gear box by a chain 238 (FIGURE 1).

The shaft 36 forming the main pivot for the mandrel frame also drives, through a sprocket 93 (FIGURE 5), a feeding device for gummed paper strip, shown in FIGURES 17–19.

Referring to these figures, the sprocket 93 on the shaft 36, forming the main pivot for the mandrel frame 29, is coupled by a chain to a sprocket 240 (FIGURE 19) mounted on a shaft 241 about which a frame 242 (FIGURE 18), carrying the mechanism for feeding gummed paper, pivots. The sprocket 240 drives the shaft 241 through a pawl 243 and ratchet 244 provided with an adjustable shroud 244a by which the driving engagement of the pawl with the ratchet 244 is terminated. (See also FIGURE 1.)

A pinion 245 mounted on the shaft 241 drives a pulley 246 through a pinion 245a and the pulley 246 is coupled to a further pulley 247 of slightly smaller diameter by a belt 246a. The pulleys 246 and 247 are mounted on shafts carrying grooved feed rollers 250 and 251, which in conjunction with spring biased roller 248 and 249 feed gummed paper strips such as 252 from supply rolls 252a along guide channels 242a in the frame 242 on to a wiping roller 253. During their passage from the rollers 248 and 250 to the rollers 249 and 251 the gummed strips are retained in the channels 242a by fingers 250a until they pass with their gummed faces upwards under wetting brushes 254, the brushes being kept moist by water from drip feeds 255. The gummed and wetted strips finally emerge from between the rollers 251 and 249 and a pair of guide fingers 251a and 249a located in grooves in the rollers onto the roller 253. The shroud on the pawl and ratchet 243 and 244 is adjusted to allow sufficient of the gummed strip to pass 1½ times around the capacitor element to be fed forward and, on completion of this feed, a cam 256 mounted on the pivot shaft 241 operates a striker arm 257 through a follower 258. A pin 259 on the end of the striker arm 257 strikes an anvil 260 mounted at the lower end of an arm 261 carrying at its upper end knife blades 262 by which, in conjunction with the fixed blades 262a mounted beneath the paper strips, these strips are cut at the end of their forward feed.

The frame 242 is supported by a stop 263 bearing against a support 264 on the machine frame, the stop being carried on a bell crank lever 265 loaded by a spring 266. In the normal position of the frame 242, that is before the mandrel carrying the completed capacitor element moves downwards, the wiping roller 253 is in the position marked 253a in FIGURE 18. As the mandrel frame 29 moves downwards about its pivot 36 a completed capacitor element at 267b (FIGURE 18) bears against the wiping roller 253 and moves it downwards from the position 253a to the position 253 shown in the drawing. The distance of the wiping roller 253 from its pivot 241 is greater than the distance of the mandrel from its pivot 36 and hence during this downward movement of the wiping roller under the action of the capacitor element, the wetted end of the gummed paper strips lying on the wiping roller will be pressed against the capacitor element with a wiping action. As already described, when the frame 29 carrying the mandrel reaches its lowest position, it is rotated through one and a half revolutions. During this rotation, the gummed paper strips are wrapped around the capacitor element and, under the action of the wiping roller 253, caused to adhere thereto and secure the element. After completion of this operation the two fingers 31 and 32 forming the mandrel barrel are withdrawn into the sleeves 54, 55 (FIGURE 5) and the completed capacitor element rolls down the chute 268 (FIGURE 1).

Before this final rotation of the mandrel through one and a half revolutions the composite strip passing from the nip to the capacitor element on the mandrel must be severed and securely clamped and the mechanism for doing this will now be described with reference to FIGURE 16.

A cam 270 on the mandrel frame cam shaft 74 operates a two-part clamp 271, 272, the parts of which are brought together on opposite sides of the composite strip, between the nip and the mandrel, just before the element on the mandrel makes contact with the gummed strips on the wiping roller 253, the clamp bearing on a part of the composite strip located approximately mid-way between the upper and lower positions 267a and 267b of the element (FIGURE 16). The two parts of the clamp are carried by arms 273, 274 attached to spindles 275, 276 on which the nip rolls 22, 23 run freely. The arm 273 is coupled by a linkage 277 to a follower 278 running on the cam 270. When the clamp makes contact with the composite strip this strip will consist of paper strips only since, owing to the fact that the mandrel has rotated through two and a half revolutions after the discharge operation commenced, the ends of the metal foils wound on the mandrel will be within the element and, as already mentioned, the ends of the metal foils still connected to the supply pads have been fed just through the nip by the feeding mechanism associated with these strips. The shape of the cam operating the clamp is such that the composite strip remains clamped until the discharge cycle has been completed and the two parts of the mandrel have been brought together around the composite strip between the clamp and the nip, that is, in the first position of the mandrel. The parts 271 and 272 of the clamp are corrugated at 279 and provided with a sponge rubber pad 280 respectively and with cutting blades 281, 282 so that, as the rotation of the mandrel through one and a half revolutions to attach the gummed paper strips commences, the composite strip will be severed.

The nip roller 23 is mounted eccentrically on its spindle 276 and biased by a spring 283 through a lever 284 in such a way that the composite strip is gripped in the nip. This is essential since, when the winding of a new element commences the metal foils are not gripped by the mandrel and must be carried on to the mandrel by the paper strips.

Finally after the element is released and allowed to fall along the shute 268 into a suitable receptacle, the mandrel frame 29 returns to its original position and the two fingers of the mandrel are simultaneously brought together one on each side of the composite strip secured between the nip and the clamp and the clamp is released. At this stage, the discharge auxiliary detent shaft will have completed its single revolution and the mandrel will again commence to rotate to wind another capacitor element. The machine will continue manufacturing capacitor elements until the paper pads and metal foils pads are exhausted.

The discharge of the element from the mandrel is assisted by spring blades 284 (FIGURES 1 and 18).

FIGURES 20 and 20a show an alternative form of mandrel finger for use in the machine described above when smaller diameter elements are to be wound, on the mandrel barrel of outside diameter 5/16".

Referring to FIGURE 20, the mandrel finger 285 is integral with and projects from a cylindrical support 286 similar to and of the same outside diameter as the cylindrical supports 52, 53 described above. The finger is not provided with a "button" at its tapered end 287 and the "anvil" at its root is in the form of an integral step 288 rising to .024" above the flat face 289 of the finger. To provide additional support for the centre part of the finger when it carries a capacitor element, it is provided with a central tapered projection 290, the shape of which is more clearly seen in FIGURE 20a.

Referring to FIGURE 20a the maximum height of the projection 290 above the flat face 289 of the finger 285 is .016". From FIGURE 20a it will be seen that when two fingers are juxtaposed in the winding position a tapered projection 292 on a lower finger 291 engages with the tapered projection 290 on the upper finger 285, to maintain a substantially uniform spacing between the flat faces of the fingers.

Immediately the longitudinal separation of the fingers commences, the tapered ends 287 of the fingers move from the anvils 288, the tapered faces of the projections 290, 292 separate and, as with the mandrel described with reference to FIGURES 5 and 6, the loading of the fingers changes from beam loading to cantilever loading.

As already mentioned, no anvil or button insets are used; the mandrel fingers are made from nitrided steel and the contacting faces of the two fingers are highly polished.

The mandrel described with reference to FIGURES 20 and 20a is not provided with a spring for gripping the composite strip, as is the mandrel described with reference to FIGURES 5 and 6. The use of such a spring is unnecessary because when the mandrel is brought into position to wind a fresh capacitor element on the composite strip supported between the nip and the clamp, sufficient composite strip projects through the mandrel and downwards to the clamp to become trapped beneath the first turn of composite strip on the mandrel, when rotation commences, to prevent the composite strip from being pulled from between the fingers during winding.

When the smaller mandrel is used, the sockets 56, 57 (FIGURE 5) are replaced by sockets of a smaller bore, slightly greater than the outside diameter of the mandrel.

The machine described is especially designed for manufacturing capacitor elements of capacitance 8 μF up to about 25 μF from strip about 4" wide up to 6" wide. It can for example manufacture 8 μF capacitor elements, 4" long from 6' of composite strip, at the rate of 75 units per hour and from a single loading can produce 70–80 units.

Owing to the tighter winding the capacitance/volume ratio of the capacitors is reduced.

Thin and fragile paper and metal foils can be wound without damage.

The elements are wound tighter than can be wound by hand to the extent that a saving in material at least 3% can be attained. The capacitance of the elements is more consistent e.g. capacitance variation of less than ±3% is readily attainable.

What I claim as my invention is:

1. An automatic capacitor winding machine comprising
    (a) means for supporting a supply of flexible strips suitable for forming a capacitor element,
    (b) a guide,
    (c) means for leading the strips through the guide to bring them into the form of a composite strip,
    (d) a two-part mandrel on which the element can be formed comprising two fingers, means for supporting each finger from one end only in such a way that they fit together side by side to make up a barrel on which the element is wound with the two supporting means at opposite ends of the barrel, means located near the root of each finger, that is near the end from which it is supported, for receiving the free end of the other finger and urging it towards the axis of the mandrel and at least one projection on the face of each finger that lies adjacent and parallel to the corresponding face of the other finger near its root, rising to a predetermined height above the face, whereby a predetermined small clearance is maintained between these faces of the fingers,
    (e) a clamp for the composite strip,
    (f) means for rotating the two-part mandrel when in a first position, to draw strips of the flexible material through the guide and wind them in the form of a composite strip on to the mandrel to build up a capacitor element,
    (g) means for stopping the mandrel when it is in a predetermined angular position and a predetermined length of flexible material has been wound thereon,
    (h) means for inserting, while the mandrel is stationary, a first terminal tab between a pair of strips being wound on the mandrel and in contact with one electrode of the capacitor,
    (i) means for rotating the mandrel, after the first terminal tab has been inserted, through a predetermined angle,
    (j) means for inserting, while the mandrel is stationary, a second terminal tab between a pair of strips being wound on the mandrel and in contact with another electrode of the capacitor,
    (k) means for rotating the mandrel, after the second terminal tab has been inserted, to continue the winding operation,
    (l) means for moving the mandrel away from the guide into a second position after a predetermined length of the composite strip has been wound on the mandrel, (m) means for stopping the rotation of the mandrel when it is in a predetermined angular position with respect to its axis of rotation, (n) means for applying the clamp to the composite strip, between the first and second position of the mandrel, (o) means for severing the composite strip between the clamp and the mandrel, (p) means for separating the parts of the mandrel to release the capacitor element and bringing the parts of the mandrel together again about the composite strip between the guide and the clamp, (q) means for releasing the clamp whereby further rotation of the mandrel initiates the winding of another capacitor element, and (r) means for positively locking the mandrel, in each angular position in which it is required to stop, that is for the insertion of tabs and for discharge of a capacitor element, comprising detents acting on detent discs mounted on a shaft mechanically coupled to the mandrel.

2. An automatic capacitor winding machine comprising (a) means for supporting a supply of flexible strips suitable for forming a capacitor element, (b) a guide, (c) means for leading the strips through the guide to bring them into the form of a composite strip, (d) a two-part mandrel on which the element can be formed (e) means for rotating the two-part mandrel to draw strips of the flexible material through the guide and wind them in the form of a composite strip on to the mandrel to build up a capacitor element, (f) means for stopping the mandrel when it is in a predetermined angular position and a predetermined length of flexible material has been wound thereon, (g) means for inserting, while the mandrel is stationary and in said predetermined angular position, a first terminal tab between a pair of strips being wound on the mandrel, (h) means for rotating the mandrel, after the insertion of said first tab, through a predetermined angle, to a second angular position (i) means for inserting, while the mandrel is stationary in said second angular position, a second terminal tab between a pair of strips being wound on the mandrel, and (j) means for again rotating the mandrel to continue the winding operation, after the insertion of said second tab.

3. A machine as claimed in claim 2 provided with (a) means for inserting more than one pair of terminal tabs, one of each pair in contact with each of two electrodes, and (b) means for rotating the mandrel through substantially the same angle, between the insertion of each tab of a pair.

4. An automatic capacitor winding machine comprising (a) means for supporting a supply of flexible strips suitable for forming a capacitor element, (b) a guide, (c) means for leading the strips through the guide to bring them into the form of a composite strip, (d) a two-part mandrel on which the element can be formed, (e) a clamp for the composite strip, (f) means for rotating the two-part mandrel when in a first position, to draw strips of the flexible material through the guide and wind them in the form of a composite strip on to the mandrel to build up a capacitor element, (g) means for moving the mandrel away from the guide into a second position after a predetermined length of the composite strip has been wound on the mandrel, (h) means for stopping the rotation of the mandrel when it is in a predetermined anguluar position with respect to its axis of rotation, (i) means for applying the clamp to the composite strip, between the first and second position of the mandrel, (j) means for severing the composite strip between the clamp and the mandrel, (k) means for separating the parts of the mandrel to release the capacitor element, (l) means for bringing the parts of the mandrel together again about the composite strip between the guide and the clamp, and (m) means for releasing the clamp, whereby on release of the clamp further rotation of the mandrel initiates the winding of another capacitor element.

5. A machine as claimed in claim 4 in which the guide through which the various strips are drawn on to the mandrel comprises (a) a pair of rollers mounted with their axes parallel to the axes of the supply coils of material from which the various strips are withdrawn, by rotation of the mandrel, and (b) means for biasing the rollers towards each other to form a nip in which the strips are brought together in the form of a composite strip and gripped.

6. A machine as claimed in claim 4 for winding a capacitor from separate strips of dielectric and conducting material, comprising (a) means for supporting a supply of flexible conducting strips suitable for forming the electrodes of a capacitor, (b) means for supporting a supply of flexible insulating strips suitable for forming the dielectric of a capacitor, (c) means for clamping and cutting the conducting strips on the opposite side of the guide from the mandrel, (d) means for actuating said clamping and cutting means after rotation of the mandrel has stopped, prior to commencing its movement away from the guide, (e) means for rotating the mandrel after said cutting to wind dielectric strips only thereon and thus to separate the cut ends of each of the conducting strips, and (f) means for positively feeding the conducting strips into the guide, between the dielectric strips, during the movement of the mandrel away from the guide.

7. A machine as claimed in claim 4 comprising means for automatically applying an adhesive strip to the element to secure the free ends of the strips to the body of the element, before it is released from the mandrel.

8. A machine as claimed in claim 7 comprising (a) a supply of adhesive strip and (b) means actuated by the movement of the mandrel support away from the guide for feeding the adhesive strip forward from the supply and cutting off an appropriate length thereof.

9. A machine as claimed in claim 7 comprising means for rotatiing the mandrel near the end of its movement away from the guide to cause the adhesive strip to be wrapped around the capacitor element.

10. An automatic capacitor winding machine comprising (a) means for supporting a supply of flexible strips suitable for forming a capacitor element, (b) a guide, (c) means for leading the strips through the guide to bring them into the form of a composite strip, (d) a two-part mandrel on which the element can be formed comprising two fingers, means for supporting each finger from one end only in such a way that they fit together side by side to make up a barrel on which the element is wound with the two supporting means at opposite ends of the barrel, means located near the root of each finger, that is near the end from which it is supported, for receiving the free end of the other finger and urging it towards the axis of the mandrel and at least one projection on the face of each finger that lies adjacent and parallel to the corresponding face of the other finger near its root, rising to a predetermined height above the face, whereby a predetermined small clearance is maintained between these faces of the fingers, (e) a clamp for the composite strip, (f) means for rotating the two-part mandrel when in a first position, to draw strips of the flexible material through the guide and wind them in the form of a composite strip on to the mandrel to build up a capacitor element, (g) means for stopping the mandrel when it is in a predetermined angular position and a predetermined length of flexible material has been wound thereon, (h) means for inserting, while the mandrel is stationary, a first terminal tab between a pair of strips being wound on the mandrel and in contact with one electrode of the capacitor, (i) means for rotating the mandrel, after the first terminal tab has been inserted, through a predetermined angle, (j) means for inserting, while the mandrel is stationary, a second terminal tab between a pair of strips being wound on the mandrel and in contact with another electrode of the capacitor, (k) means for rotating the mandrel, after the second terminal tab has been inserted, to continue the winding operation, (l) means for moving the mandrel away from the guide into a second position after a predetermined length of the composite strip has been wound on the mandrel, (m) means for stopping the rotation of the mandrel when it is in a predetermined angular position with respect to its axis of rotation, (n) means for applying the clamp to the composite strip, between the first and second position of the mandrel, (o) means for severing the composite strip between the clamp and the mandrel, (p) means for separating the parts of the mandrel to release the capacitor element and bringing the parts of the mandrel together again about the composite strip between the guide and the clamp and, (q) means for releasing the clamp whereby further rotation of the mandrel initiates the winding of another capacitor element.

11. A machine as claimed in claim 10 in which each of the mandrel fingers has a projection both near its free end and near its root, both projections co-operating with similar projections on the other finger to maintain the desired spacing between the flat faces of the fingers.

12. A machine as claimed in claim 10 in which the disposition and height of the projections is such that when the mandrel fingers fit together to form a barrel which carries a roll of strip material the fingers are positively spaced from each other at points near their ends only so that they can flex towards each other under the pressure exerted by the roll between said points, being loaded as beams, and while the fingers are being withdrawn from the element they are supported by their end supports only and can flex towards each other at their free ends, being loaded as cantilevers.

13. An automatic capacitor winding machine comprising (a) means for supporting a supply of flexible strips suitable for forming a capacitor element, (b) a guide, (c) means for leading the strips through the guide to bring them into the form of a composite strip, (d) a two-part mandrel on which the element can be formed, (e) means for rotating the mandrel when in a plurality of axial positions to draw strips of the flexible material through the guide and wind them in the form of a composite strip on the mandrel, (f) means for feeding terminal tabs between said strips when the mandrel is stationary, (g) means for discharging completed capacitor elements from said mandrel and (h) means for automatically stopping the rotation of the mandrel when it is in each of a plurality of predetermined angular positions with respect to a first axis of rotation and at least one angular position with respect to a second axis of rotation, and for positively locking the mandrel, in each of said angular positions in which it is required to stop, that is for the insertion of said tabs and for discharge of a capacitor element, said means for stopping and locking the mandrel comprising detents acting on detent discs mounted on a shaft mechanically coupled to the mandrel.

14. A machine as claimed in claim 13 comprising (a) means for the insertion of at least two pairs of tabs and (b) detents for stopping the mandrel at least four times such that a first angular position in which it is stopped is always substantially the same for the first tab of each pair and a second angular position in which it is stopped is always substantially the same for the second tab of each pair.

15. A machine as claimed in claim 13 comprising (a) a shaft carrying the detent discs and forming part of the means for rotating the mandrel, (b) a clutch coupling to said shaft a second shaft forming part of the means for rotating the mandrel, and (c) means for releasing the clutch a sufficient time before the detents associated with the tabs and with the discharge of an element engage with their detent discs to ensure that the means for rotating the mandrel is not subjected to excessive shock by the engagement of the detent.

16. A machine as claimed in claim 13 in which means is provided for initiating upon the movement of a detent into a position in which it locks the mandrel in the required position for the insertion of the first tab, a sequence of events comprising (a) the insertion of a first tab, (b) the rotation of the mandrel through a predetermined angle, (c) the insertion of a second tab, and (d) the restarting of the mandrel to continue the winding operation.

17. A machine as claimed in claim 13 in which (a) the means for rotating the mandrel drives the means for feeding tabs and discharging capacitor elements, and (b) included in the drives to these mechanisms are auxiliary cam and detent shafts, which, in conjunction with the detent for locking the mandrel, control the starting and stopping of the mandrel and the feeding of tabs.

18. A machine as claimed in claim 13 provided with (a) a change speed mechanism for reducing the speed of the mandrel and (b) means for operating said mechanism shortly before the mandrel is stopped for the insertion of a first tab of each pair and at the commencement of the discharge cycle.

19. A machine as claimed in claim 18 provided with
   (a) a length measuring device operated by one of the flexible strips being wound on to the mandrel and
   (b) means for operating the change speed mechanism and the detents for locking the mandrel in position for the insertion of the first tab of each pair under the control of the length measuring device.

20. An automatic capacitor winding machine, for winding a capacitor from separate strips of dielectric and conducting material, comprising
   (a) means for supporting a supply of flexible conducting strips suitable for forming the electrodes of a capacitor,
   (b) means for supporting a supply of flexible insulating strips suitable for forming the dielectric of a capacitor,
   (c) a guide,
   (d) means for leading the strips through the guide to bring them into the form of a composite strip,
   (e) a two-part mandrel on which the element can be formed,
   (f) means for rotating the two-part mandrel when in a first position, to draw strips of flexible dielectric and conducting material through the guide and wind them in the form of a composite strip on to the mandrel to build up a capacitor element.
   (g) means for clamping and cutting the conducting strips on the opposite side of the guide from the mandrel after a predetermined length of the composite strip has been wound on to the mandrel,
   (h) means for rotating the mandrel to wind dielectric strips only thereon and thus to separate the cut ends of the conducting strip,
   (i) means for stopping the rotation of the mandrel when it is in a predetermined angular position with respect to its axis of rotation,
   (j) means for moving the mandrel away from the guide into a second position and simultaneously positively feeding the conducting strips into the guide,
   (k) a clamp,
   (l) means for applying the clamp to the composite strip, between the first and second position of the mandrel,
   (m) means for severing the composite strip between the clamp and the mandrel,
   (n) means for separating the parts of the mandrel to release the capacitor element and bringing the parts of the mandrel together again about the composite strip between the guides and the clamps, and
   (o) means for releasing the clamp whereby further rotation of the mandrel initiates the winding of another capacitor element.

21. A machine as claimed in claim 20 in which the clamp applied to the composite strip is applied between the ends of the conducting strips wound on the mandrel and the ends of the conducting strips in the nip.

22. A machine as claimed in claim 20 comprising driving means mechanically coupled to the mandrel support and driven by the movement of this support away from the nip which feed the conducting strips into the nip, after cutting.

23. An automatic capacitor winding machine comprising
   (a) means for supporting a supply of flexible strips suitable for forming a capacitor element,
   (b) a guide,
   (c) means for leading the strips through the guide to bring them into the form of a composite strip,
   (d) a two-part mandrel on which the element can be formed comprising two fingers, means for supporting each finger from one end only in such a way that they fit together side by side to make up a barrel on which the element is wound with the two supporting means at opposite ends of the barrel, means located near the root of each finger, that is near the end from which it is supported, for receiving the free end of the other finger and urging it towards the axis of the mandrel and at least one projection on the face of each finger that lies adjacent and parallel to the corresponding face of the other finger near its root, rising to a predetermined height above the face, whereby a predetermined small clearance is maintained between these faces of the fingers,
   (e) means for rotating the mandrel to wind the composite strip thereon to form a capacitor element, and
   (f) means for separating the two parts of the mandrel to release said element.

24. A machine as claimed in claim 23 in which
   (a) each of the mandrel fingers has a projection both near its free end and near its root, and
   (b) both projections co-operate with similar projections on the other finger to maintain the desired spacing between the flat faces of the fingers.

25. A machine as claimed in claim 23 in which the disposition and height of the projections is such that when the mandrel fingers fit together to form a barrel which carries a roll of strip material the fingers are positively spaced from each other at points near their ends only so that they can flex towards each other under the pressure exerted by the roll between said points, being loaded as beams, and while the fingers are being withdrawn from the element they are loaded as cantilevers.

26. An automatic capacitor winding machine comprising
   (a) means for supporting a supply of flexible strips suitable for forming a capacitor element,
   (b) a guide,
   (c) means for leading the strips through the guide to bring them into the form of a composite strip,
   (d) a two-part mandrel on which the element can be formed,
   (e) a clamp for the composite strip,
   (f) means for rotating the two-part mandrel when in a first position, to draw strips of the flexible material through the guide and wind them in the form of a composite strip on to the mandrel to build up a capacitor element,
   (g) means for stopping the mandrel when it is in a predetermined angular position and a predetermined length of flexible material has been wound thereon,
   (h) means for inserting a first terminal tab between a pair of strips being wound on the mandrel in contact with one electrode of the capacitor,
   (i) means for rotating the mandrel through a predetermined angle after the insertion of the first terminal tab,
   (j) means for inserting a second terminal tab between a pair of strips being wound on the mandrel in contact with another electrode of the capacitor,
   (k) means for again rotating the mandrel after the insertion of the second terminal tab to continue the winding operation,
   (l) means for moving the mandrel away from the guide into a second position after a predetermined length of the composite strip has been wound on the mandrel,
   (m) means for stopping the rotation of the mandrel when it is in a predetermined angular position with respect to its axis of rotation,
   (n) means for applying the clamp to the composite strip, between the first and second position of the mandrel,
   (o) means for severing the composite strip between the clamp and the mandrel,
   (p) means for separating the parts of the mandrel to release the capacitor element and bringing the parts of the mandrel together again about the composite strip between the guide and the clamp, and (q) means for releasing the clamp whereby further rotation of the mandrel initiates the winding of another capacitor element.

27. A machine as claimed in claim 26 comprising
(a) means for inserting more than one pair of terminal tabs, one of each pair in contact with each of two electrodes, and
(b) means for rotating the mandrel through substantially the same angle, between the insertion of each tab of a pair.

28. A machine as claimed in claim 27 comprising means for stopping the mandrel always in substantially the same angular position when inserting the first tab of a pair so that, in the finished element, all of the tabs in contact with the same electrode will lie substantially on the same radius in the element ready for interconnection, as by folding them together.

References Cited in the file of this patent

UNITED STATES PATENTS

| | | |
|---|---|---|
| 2,040,323 | McCain | May 12, 1936 |
| 2,384,983 | Weiss | Sept. 18, 1945 |
| 2,547,644 | Hogue et al. | Apr. 3, 1951 |
| 3,018,064 | Dubilier | Jan. 23, 1962 |

UNITED STATES PATENT OFFICE
CERTIFICATE OF CORRECTION

Patent No. 3,113,740            December 10, 1963

Ronald Hinds

It is hereby certified that error appears in the above numbered patent requiring correction and that the said Letters Patent should read as corrected below.

Column 2, line 23, after "each" insert -- end --; column 3, line 27, for "strips" read -- strip --; column 7, line 54, before "fingers" insert -- two --; column 9, line 34, for "relay", first occurrence, read -- delay --; column 12, line 31, after "main" insert -- drive --; column 14, line 29, for "auvxiliary" read -- auxiliary --; column 23, line 49, for "guides" read -- guide --.

Signed and sealed this 16th day of June 1964.

(SEAL)
Attest:

ERNEST W. SWIDER
Attesting Officer

EDWARD J. BRENNER
Commissioner of Patents